United States Patent
Alen et al.

(10) Patent No.: US 12,522,586 B2
(45) Date of Patent: Jan. 13, 2026

(54) SUBSTITUTED PYRROLIDINE AMINES AND AMIDES VI

(71) Applicant: Gruenenthal GmbH, Aachen (DE)

(72) Inventors: Jo Alen, Averbode (BE); Florian Jakob, Aachen (DE); Sebastian Krueger, Aachen (DE); Philipp Barbie, Berlin (DE)

(73) Assignee: GRUENENTHAL GMBH, Aachen (DE)

( * ) Notice: Subject to any disclaimer, the term of this patent is extended or adjusted under 35 U.S.C. 154(b) by 463 days.

(21) Appl. No.: 18/015,251

(22) PCT Filed: Jul. 9, 2021

(86) PCT No.: PCT/EP2021/069112
§ 371 (c)(1),
(2) Date: Jan. 9, 2023

(87) PCT Pub. No.: WO2022/008705
PCT Pub. Date: Jan. 13, 2022

(65) Prior Publication Data
US 2023/0265078 A1      Aug. 24, 2023

(30) Foreign Application Priority Data

Jul. 9, 2020    (EP) .................... 20185024

(51) Int. Cl.
| C07D 403/04 | (2006.01) |
| C07D 401/14 | (2006.01) |
| C07D 403/14 | (2006.01) |
| C07D 405/14 | (2006.01) |
| C07D 417/14 | (2006.01) |

(52) U.S. Cl.
CPC ......... *C07D 403/04* (2013.01); *C07D 401/14* (2013.01); *C07D 403/14* (2013.01); *C07D 405/14* (2013.01); *C07D 417/14* (2013.01)

(58) Field of Classification Search
CPC .. C07D 403/04; C07D 401/14; C07D 403/14; C07D 405/14; C07D 417/14
See application file for complete search history.

(56) References Cited

U.S. PATENT DOCUMENTS

| 7,947,727 | B2 | 5/2011 | Biggadike et al. |
| 8,143,290 | B2 | 3/2012 | Berger et al. |
| 8,178,573 | B2 | 5/2012 | Biggadike et al. |
| 9,738,632 | B2 | 8/2017 | Berger et al. |
| 10,196,374 | B2 | 2/2019 | Ripa et al. |
| 10,435,379 | B2 | 10/2019 | Kawashima et al. |
| 10,626,106 | B2 | 4/2020 | Jakob et al. |
| 2019/0185455 | A1* | 6/2019 | Jakob et al. |
| 2019/0185470 | A1* | 6/2019 | Jakob et al. |
| 2022/0127264 | A1 | 4/2022 | Jakob et al. |

FOREIGN PATENT DOCUMENTS

| WO | 2007/122165 A1 | 11/2007 |
| WO | 2008/043789 A1 | 4/2008 |
| WO | 2008/076048 A1 | 6/2008 |
| WO | 2009/035067 A1 | 3/2009 |
| WO | 2009/142571 A1 | 11/2009 |
| WO | 2016/046260 A1 | 3/2016 |
| WO | 2017/034006 A1 | 3/2017 |
| WO | 2019/121606 A1 | 6/2019 |
| WO | 2019/121611 A1 | 6/2019 |

* cited by examiner

*Primary Examiner* — Kortney L. Klinkel
*Assistant Examiner* — Jackson J Hernandez
(74) *Attorney, Agent, or Firm* — Norris McLaughlin, P.A.

(57) ABSTRACT

The invention relates to compounds according to general formula (I)

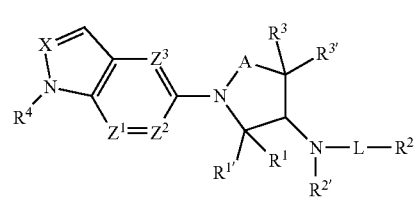

which act as modulators of the glucocorticoid receptor and can be used in the treatment and/or prophylaxis of disorders which are at least partially mediated by the glucocorticoid receptor.

18 Claims, No Drawings

SUBSTITUTED PYRROLIDINE AMINES AND AMIDES VI

This application is a 371 of International Patent Application No. PCT/EP2021/069112, filed Jul. 9, 2021, which claims priority of European Patent Application No. 20185024.5, filed Jul. 9, 2020, the disclosures of which patent applications are hereby incorporated herein by reference.

The invention relates to compounds according to general formula (I)

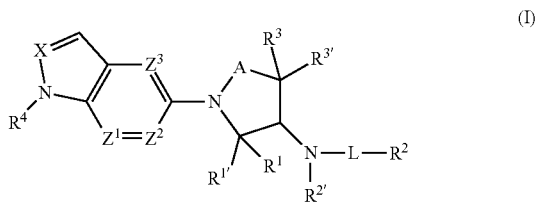

which act as modulators of the glucocorticoid receptor and can be used in the treatment and/or prophylaxis of disorders which are at least partially mediated by the glucocorticoid receptor.

Glucocorticoids (GC) exert strong anti-inflammatory, immunosuppressive and disease-modifying therapeutic effects mediated by the glucocorticoid receptor (GR). They have been widely used to treat inflammatory and immune diseases for decades and still represent the most effective therapy in those conditions. However, chronic GC treatment of inflammatory diseases such as asthma, rheumatoid arthritis, inflammatory bowel disease, chronic obstructive pulmonary disease, acute respiratory distress syndrome, cystic fibrosis, osteoarthritis, polymyalgia rheumatica and giant cell arteritis is hampered by GC-associated adverse effects. These undesired side effects include insulin resistance, diabetes, hypertension, glaucoma, depression, osteoporosis, adrenal suppression and muscle wasting with osteoporosis and diabetes being the most severe ones from the physician's point of view (Hapgood J P. et al., Pharmacol Ther. 2016 September; 165: 93-113; Buttgereit F. el al, Clin Exp Rheumatol. 2015 July-August; 33 (4 Suppl 92):S29-33; Hartmann K. et al, Physiol Rev. 2016 April; 96(2):409-47).

One example of an oral glucocorticoid is prednisone which is frequently prescribed for the treatment of several inflammatory disorders (De Bosscher K et al., Trends Pharmacol Sci. 2016 January; 37(1):4-16; Buttgereit F. et al., JAMA. 2016; 315(22):2442-2458). As GC cause adrenal suppression, prednisolone withdrawal symptoms can be severe if the drug is discontinued abruptly when all the signs of the disease have disappeared. Thus gradual GC tapering to physiological doses is frequently part of treatment protocols to reduce the risk of relapse and other withdrawal symptoms (Liu D. et al., Allergy Asthma Clin Immunol. 2013 Aug. 15; 9(1):30). Therefore, there is high medical need for novel potent anti-inflammatory drugs with less adverse effects.

Recent research has focused on the development of partial agonists or selective glucocorticoid receptor modulators which activate the pathways for the inhibition of inflammation but avoid targeting the pathways that lead to the GC-associated adverse effects. Most of these effects have been demonstrated to be mediated by different GR-dependent genomic mechanisms termed transactivation and transrepression. The anti-inflammatory actions of GC are mainly attributable to the transrepression of inflammatory genes while certain side effects are predominantly mediated via transactivation of several genes. According to the nature of a ligand the GR can be selectively modulated in a specific conformation which favors transrepression over transactivation resulting in an improved therapeutic benefit (De Bosscher K et al., Trends Pharmacol Sci. 2016 January; 37(1):4-16). The concept of such dissociating ligands was already defined about two decades ago and several compounds have been identified and were evaluated in preclinical and clinical testing but none of them has as yet been approved for clinical use.

Compounds which are active as modulators of the glucocorticoid receptor are also known e.g. from WO 2007/122165, WO 2008/076048 and WO 2008/043789, WO 2009/035067, WO 2009/142571, WO 2016/046260, WO 2017/034006, WO 2019/121611 and WO 2019/121606.

It was an object of the invention to provide novel compounds which are modulators of the glucocorticoid receptor and which preferably have advantages over the compounds of the prior art. The novel compounds should in particular be suitable for use in the treatment and/or prophylaxis of disorders or diseases which are at least partially mediated by the glucocorticoid receptor.

This object has been achieved by the subject-matter of the patent claims.

It was surprisingly found that the compounds according to the invention are highly potent modulators of the glucocorticoid receptor.

The invention relates to a compound according to general formula (I),

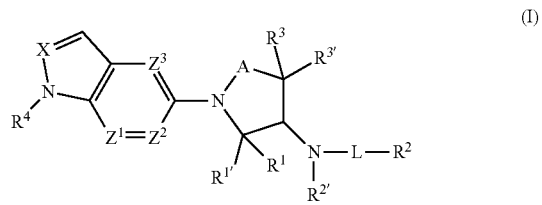

wherein
A represents C=O or S(=O)$_2$;
R$^1$ represents phenyl; —C$_{1-6}$-alkylene-phenyl; 5 or 6-membered heteroaryl; or —C$_{1-6}$-alkylene-(5 or 6-membered heteroaryl);
R$^{1'}$ represents H; or —C$_{1-10}$-alkyl;
L represents bond; —C$_{1-6}$-alkylene; C=O; or S(O)$_2$; wherein if A represents C=O, L neither represents C=O nor S(O)$_2$;
R$^2$ represents —C$_{1-10}$-alkyl; —C$_{3-10}$-cycloalkyl; 3 to 7 membered heterocycloalkyl; phenyl; or 5 or 6-membered heteroaryl;
R$^{2'}$ represents H; or —C$_{1-10}$-alkyl; —C$_{3-10}$-cycloalkyl; or —C$_{1-6}$-alkylene-C$_{3-10}$-cycloalkyl;
R$^3$ and R$^{3'}$ independently from one another represent H; or —C$_{1-10}$-alkyl;
or R$^3$ and R$^{3'}$ together with the carbon atom to which they are bound form a C$_{3-10}$-cycloalkyl; or 3 to 7 membered heterocycloalkyl;
R$^4$ represents phenyl; or 5 or 6-membered heteroaryl;
X represents N or CH;
Z$^1$, Z$^2$ and Z$^3$ each independently from one another represent N or CH;

wherein —$C_{1-10}$-alkyl and —$C_{1-6}$-alkylene- in each case independently from one another is linear or branched, saturated or unsaturated;

wherein —$C_{1-10}$-alkyl, —$C_{1-6}$-alkylene-, —$C_{3-10}$-cycloalkyl and 3 to 7 membered heterocycloalkyl in each case independently from one another are unsubstituted or mono- or polysubstituted with one or more substituents selected from —F; —Cl; —Br; —I; —CN; —$C_{1-6}$-alkyl; —$CF_3$; —$CF_2H$; —$CFH_2$; —$CF_2Cl$; —$CFCl_2$; —C(=O)—$C_{1-6}$-alkyl; —C(=O)—OH; —C(=O)—$OC_{1-6}$-alkyl; —C(=O)—$NH_2$; —C(=O)—NH($C_{1-6}$-alkyl); —C(=O)—N($C_{1-6}$-alkyl)$_2$; —OH; —$OCF_3$; —$OCF_2H$; —$OCFH_2$; —$OCF_2Cl$; —$OCFCl_2$; —O—$C_{1-6}$-alkyl; —O—C(=O)—$C_{1-6}$-alkyl; —O—C(=O)—O—$C_{1-6}$-alkyl; —O—(CO)—NH($C_{1-6}$-alkyl); —O—C(=O)—N($C_{1-6}$-alkyl)$_2$; —O—S(=O)$_2$—$NH_2$; —O—S(=O)$_2$—NH($C_{1-6}$-alkyl); —O—S(=O)$_2$—N($C_{1-6}$-alkyl)$_2$; —$NH_2$; —NH($C_{1-6}$-alkyl); —N($C_{1-6}$-alkyl)$_2$; —NH—C(=O)—$C_{1-6}$-alkyl; —NH—C(=O)—O—$C_{1-6}$-alkyl; —NH—C(=O)—$NH_2$; —NH—C(=O)—NH($C_{1-6}$-alkyl); —NH—C(=O)—N($C_{1-6}$-alkyl)$_2$; —N($C_{1-6}$-alkyl)-C(=O)—$C_{1-6}$-alkyl; —N($C_{1-6}$-alkyl)-C(=O)—O—$C_{1-6}$-alkyl; —N($C_{1-6}$-alkyl)-C(=O)—$NH_2$; —N($C_{1-6}$-alkyl)-C(=O)—NH($C_{1-6}$-alkyl); —N($C_{1-6}$-alkyl)-C(=O)—N($C_{1-6}$-alkyl)$_2$; —NH—S(=O)$_2$OH; —NH—S(=O)$_2$—$C_{1-6}$-alkyl; —NH—S(=O)$_2$—O—$C_{1-6}$-alkyl; —NH—S(=O)$_2$—$NH_2$; —NH—S(=O)$_2$—NH($C_{1-6}$-alkyl); —NH—S(=O)$_2$N($C_{1-6}$-alkyl)$_2$; —N($C_{1-6}$-alkyl)-S(=O)$_2$—OH; —N($C_{1-6}$-alkyl)-S(=O)$_2$—$C_{1-6}$-alkyl; —N($C_{1-6}$-alkyl)-S(=O)$_2$—O—$C_{1-6}$-alkyl; —N($C_{1-6}$-alkyl)-S(=O)$_2$—$NH_2$; —N($C_{1-6}$-alkyl)-S(=O)$_2$—NH($C_{1-6}$-alkyl); —N($C_{1-6}$-alkyl)-S(=O)$_2$—N($C_{1-6}$-alkyl)$_2$; —$SCF_3$; —$SCF_2H$; —$SCFH_2$; —S—$C_{1-6}$-alkyl; —S(=O)—$C_{1-6}$-alkyl; —S(=O)$_2$—$C_{1-6}$-alkyl; —S(=O)$_2$—OH; —S(=O)$_2$—O—$C_{1-6}$-alkyl; —S(=O)$_2$—$NH_2$; —S(=O)$_2$—NH($C_{1-6}$-alkyl); —S(=O)$_2$—N($C_{1-6}$-alkyl)$_2$; —$C_{3-6}$-cycloalkyl; 3 to 6-membered heterocycloalkyl; phenyl; 5 or 6-membered heteroaryl; —O—$C_{3-6}$-cycloalkyl; —O-(3 to 6-membered heterocycloalkyl); —O-phenyl; —O-(5 or 6-membered heteroaryl); —C(=O)—$C_{3-6}$-cycloalkyl; —C(=O)-(3 to 6-membered heterocycloalkyl); —C(=O)-phenyl; —C(=O)-(5 or 6-membered heteroaryl); —S(=O)$_2$—($C_{3-6}$-cycloalkyl); —S(=O)$_2$-(3 to 6-membered heterocycloalkyl); —S(=O)$_2$-phenyl and —S(=O)$_2$-(5 or 6-membered heteroaryl);

wherein phenyl and 5 or 6-membered heteroaryl in each case independently from one another are unsubstituted or mono- or polysubstituted with one or more substituents selected from —F; —Cl; —Br; —I; —CN; —$C_{1-6}$-alkyl; —$CF_3$; —$CF_2H$; —$CFH_2$; —$CF_2Cl$; —$CFCl_2$; —$C_{1-4}$-alkylene-$CF_3$; —$C_{1-4}$-alkylene-$CF_2H$; —$C_{1-4}$-alkylene-$CFH_2$; —C(=O)—$C_{1-6}$-alkyl; —C(=O)—OH; —C(=O)—$OC_{1-6}$-alkyl; —C(=O)—NH(OH); —C(=O)—$NH_2$; —C(=O)—NH($C_{1-6}$-alkyl); —C(=O)—N($C_{1-6}$-alkyl)$_2$; —OH; =O; —$OCF_3$; —$OCF_2H$; —$OCFH_2$; —$OCF_2Cl$; —$OCFCl_2$; —O—$C_{1-6}$-alkyl; —O—$C_{3-6}$-cycloalkyl; —O-(3 to 6-membered heterocycloalkyl); —O-phenyl; —O-(5 or 6-membered heteroaryl); —$NH_2$; —NH($C_{1-6}$-alkyl); —N($C_{1-6}$-alkyl)$_2$; —NH—C(=O)—$C_{1-6}$-alkyl; —N($C_{1-6}$-alkyl)-C(=O)—$C_{1-6}$-alkyl; —NH—C(=O)—$NH_2$; —NH—C(=O)—NH($C_{1-6}$-alkyl); —NH—C(=O)—N($C_{1-6}$-alkyl)$_2$; —N($C_{1-6}$-alkyl)-C(=O)—NH($C_{1-6}$-alkyl); —N($C_{1-6}$-alkyl)-C(=O)—N($C_{1-6}$-alkyl)$_2$; —NH—S(=O)$_2$—$C_{1-6}$-alkyl; —$SCF_3$; —S—$C_{1-6}$-alkyl; —S(=O)—$C_{1-6}$-alkyl; —S(=O)$_2$—$C_{1-6}$-alkyl; —S(=O)$_2$—$NH_2$; —S(=O)$_2$—NH($C_{1-6}$-alkyl); —S(=O)$_2$—N($C_{1-6}$-alkyl)$_2$; —$C_{3-6}$-cycloalkyl; —$C_{1-4}$-alkylene-$C_{3-6}$-cycloalkyl; 3 to 6-membered heterocycloalkyl; —$C_{1-4}$-alkylene-(3 to 6-membered heterocycloalkyl); phenyl and 5 or 6-membered heteroaryl;

in the form of the free compound or a physiologically acceptable salt thereof.

In a preferred embodiment, the compound according to the invention is present in form of the free compound. For the purpose of specification, "free compound" preferably means that the compound according to the invention is not present in form of a salt. Methods to determine whether a chemical substance is present as the free compound or as a salt are known to the skilled artisan such as $^{14}N$ or $^{15}N$ solid state NMR, x-ray diffraction, x-ray powder diffraction, IR, Raman, XPS. $^1H$-NMR recorded in solution may also be used to consider the presence of protonation.

In another preferred embodiment, the compound according to the invention is present in form of a physiologically acceptable salt. For the purposes of this specification, the term "physiologically acceptable salt" preferably refers to a salt obtained from a compound according to the invention and a physiologically acceptable acid or base.

According to the invention, the compound according to the invention may be present in any possible form including solvates, cocrystals and polymorphs. For the purposes of this specification, the term "solvate" preferably refers to an adduct of (i) a compound according to the invention and/or a physiologically acceptable salt thereof with (ii) distinct molecular equivalents of one or more solvents.

Further, the compound according to the invention may be present in form of the racemate, enantiomers, diastereomers, tautomers or any mixtures thereof.

The invention also includes isotopic isomers of a compound of the invention, wherein at least one atom of the compound is replaced by an isotope of the respective atom which is different from the naturally predominantly occurring isotope, as well as any mixtures of isotopic isomers of such a compound. Preferred isotopes are $^2H$ (deuterium), $^3H$ (tritium), $^{13}C$ and $^{14}C$. Isotopic isomers of a compound of the invention can generally be prepared by conventional procedures known to a person skilled in the art.

According to the invention, the terms "—$C_{1-10}$-alkyl", "—$C_{1-8}$-alkyl", "—$C_{1-6}$-alkyl" and "—$C_{1-4}$-alkyl" preferably mean acyclic saturated or unsaturated aliphatic (i.e. non-aromatic) hydrocarbon residues, which can be linear (i.e. unbranched) or branched and which can be unsubstituted or mono- or polysubstituted (e.g. di- or trisubstituted), and which contain 1 to 10 (i.e. 1, 2, 3, 4, 5, 6, 7, 8, 9 or 10), 1 to 8 (i.e. 1, 2, 3, 4, 5, 6, 7 or 8), 1 to 6 (i.e. 1, 2, 3, 4, 5 or 6) and 1 to 4 (i.e. 1, 2, 3 or 4) carbon atoms, respectively. In a preferred embodiment, —$C_{1-10}$-alkyl, —$C_{1-8}$-alkyl, —$C_{1-6}$-alkyl and —$C_{1-4}$-alkyl are saturated.

Preferred —$C_{1-10}$-alkyl groups are selected from methyl, ethyl, ethenyl (vinyl), n-propyl, 2-propyl, 1-propynyl, 2-propynyl, propenyl (—$CH_2CH=CH_2$, —CH=CH—$CH_3$, —C(=$CH_2$)—$CH_3$), n-butyl, 1-butynyl, 2-butynyl, 1-butenyl, 2-butenyl, isobutyl, sec-butyl, tert-butyl, n-pentyl, 2-pentyl, 3-pentyl, 1-pentenyl, 2-pentenyl, 1-pentynyl, 2-pentynyl, 2-methylbutyl, 3-methylbutyl, 3-methylbut-2-yl, 2-methylbut-2-yl, 3-methylbut-1-ynyl, 2,2-dimethylpropyl, n-hexyl, 2-hexyl, 3-hexyl, 2-methylpentyl, 4-methylpentyl, 4-methylpent-2-yl, 2-methylpent-2-yl, 3,3-dimethylbutyl, 3,3-dimethylbut-2-yl, 3-methylpentyl, 3-methylpent-2-yl and 3-methylpent-3-yl; more preferably methyl, ethyl, n-propyl, 2-propyl, 1-propynyl, 2-propynyl, propenyl (—CH$_2$CH=CH$_2$, —CH=CH—CH$_3$, —C(=CH$_2$)—CH$_3$), n-butyl, 1-butynyl, 2-butynyl, 1-butenyl, 2-butenyl, isobutyl, sec-butyl, tert-butyl, n-pentyl, 2-pentyl, 3-pentyl, 1-pentenyl, 2-pentenyl, 1-pentynyl, 2-pentynyl, 2-methylbutyl, 3-methylbutyl, 3-methylbut-2-yl, 2-methylbut-2-yl, 3-methylbut-1-ynyl, 2,2-dimethylpropyl, n-hexyl, n-heptyl, n-octyl, n-nonyl and n-decyl. Particularly preferred —C$_{1-10}$-alkyl groups are selected from C$_{1-4}$-alkyl groups.

Preferred —C$_{1-8}$-alkyl groups are selected from methyl, ethyl, ethenyl (vinyl), n-propyl, 2-propyl, 1-propynyl, 2-propynyl, propenyl (—CH$_2$CH=CH$_2$, —CH=CH—CH$_3$, —C(=CH$_2$)—CH$_3$), n-butyl, 1-butynyl, 2-butynyl, 1-butenyl, 2-butenyl, isobutyl, sec-butyl, tert-butyl, n-pentyl, 2-pentyl, 3-pentyl, 1-pentenyl, 2-pentenyl, 1-pentynyl, 2-pentynyl, 2-methylbutyl, 3-methylbutyl, 3-methylbut-2-yl, 2-methylbut-2-yl, 3-methylbut-1-ynyl, 2,2-dimethylpropyl, n-hexyl, 2-hexyl, 3-hexyl, 2-methylpentyl, 4-methylpentyl, 4-methylpent-2-yl, 2-methylpent-2-yl, 3,3-dimethylbutyl, 3,3-dimethylbut-2-yl, 3-methylpentyl, 3-methylpent-2-yl and 3-methylpent-3-yl; more preferably methyl, ethyl, n-propyl, 2-propyl, 1-propynyl, 2-propynyl, propenyl (—CH$_2$CH=CH$_2$, —CH=CH—CH$_3$, —C(=CH$_2$)—CH$_3$), n-butyl, 1-butynyl, 2-butynyl, 1-butenyl, 2-butenyl, isobutyl, sec-butyl, tert-butyl, n-pentyl, 2-pentyl, 3-pentyl, 1-pentenyl, 2-pentenyl, 1-pentynyl, 2-pentynyl, 2-methylbutyl, 3-methylbutyl, 3-methylbut-2-yl, 2-methylbut-2-yl, 3-methylbut-1-ynyl, 2,2-dimethylpropyl, n-hexyl, n-heptyl and n-octyl. Particularly preferred —C$_{1-8}$-alkyl groups are selected from C$_{1-4}$-alkyl groups.

Preferred —C$_{1-6}$-alkyl groups are selected from methyl, ethyl, ethenyl (vinyl), n-propyl, 2-propyl, n-butyl, isobutyl, sec-butyl, tert-butyl, n-pentyl, 2-pentyl, 3-pentyl, 2-methylbutyl, 3-methylbutyl, 3-methylbut-2-yl, 2-methylbut-2-yl, 2,2-dimethylpropyl, n-hexyl, 2-hexyl, 3-hexyl, 2-methylpentyl, 4-methylpentyl, 4-methylpent-2-yl, 2-methylpent-2-yl, 3,3-dimethylbutyl, 3,3-dimethylbut-2-yl, 3-methylpentyl, 3-methylpent-2-yl and 3-methylpent-3-yl; more preferably methyl, ethyl, n-propyl, 2-propyl, 1-propynyl, 2-propynyl, propenyl (—CH$_2$—CH=CH$_2$, —CH=CH—CH$_3$, —C(=CH$_2$)—CH$_3$), n-butyl, 1-butynyl, 2-butynyl, 1-butenyl, 2-butenyl, isobutyl, sec-butyl, tert-butyl, n-pentyl, 2-pentyl, 3-pentyl, 1-pentenyl, 2-pentenyl, 1-pentynyl, 2-pentynyl, 2-methylbutyl, 3-methylbutyl, 3-methylbut-2-yl, 2-methylbut-2-yl, 3-methylbut-1-ynyl, 2,2-dimethylpropyl, n-hexyl. Particularly preferred —C$_{1-6}$-alkyl groups are selected from C$_{1-4}$-alkyl groups.

Preferred —C$_{1-4}$-alkyl groups are selected from methyl, ethyl, ethenyl (vinyl), n-propyl, 2-propyl, 1-propynyl, 2-propynyl, propenyl (—CH$_2$CH=CH$_2$, —CH=CH—CH$_3$, —C(=CH$_2$)—CH$_3$), n-butyl, 1-butynyl, 2-butynyl, 1-butenyl, 2-butenyl, isobutyl, sec-butyl, tert-butyl and 3-methylbut-1-ynyl. More preferred —C$_{1-4}$-alkyl groups are selected from methyl, ethyl, n-propyl, 2-propyl, 1-propynyl, 2-propynyl, n-butyl, isobutyl, sec-butyl, and tert-butyl.

Further according to the invention, the terms "—C$_{1-6}$-alkylene-"; "—C$_{1-4}$-alkylene-" and "—C$_{1-2}$-alkylene-" relate to a linear or branched, preferably linear, and preferably saturated aliphatic residues which are preferably selected from the group consisting of methylene (—CH$_2$—), ethylene (—CH$_2$CH$_2$—), propylene (—CH$_2$CH$_2$CH$_2$— or —C(CH$_3$)$_2$—), butylene (—CH$_2$CH$_2$CH$_2$CH$_2$—), pentylene (—CH$_2$CH$_2$CH$_2$CH$_2$CH$_2$—) and hexylene (—CH$_2$CH$_2$CH$_2$CH$_2$CH$_2$CH$_2$—); more preferably methylene (—CH$_2$—) and ethylene (—CH$_2$CH$_2$—) and most preferably methylene (—CH$_2$—). Preferably, —C$_{1-6}$-alkylene- is selected from —C$_{1-4}$-alkylene-, more preferably from —C$_{1-2}$-alkylene-.

Still further according to the invention, the terms "—C$_{3-10}$-cycloalkyl" and "—C$_{3-6}$-cycloalkyl" preferably mean cyclic aliphatic hydrocarbons containing 3, 4, 5, 6, 7, 8, 9 or 10 carbon atoms and 3, 4, 5 or 6 carbon atoms, respectively, wherein the hydrocarbons in each case can be saturated or unsaturated (but not aromatic), unsubstituted or mono- or poly substituted.

Preferably, —C$_{3-10}$-cycloalkyl and —C$_{3-6}$-cycloalkyl are saturated. The —C$_{3-10}$-cycloalkyl and —C$_{3-6}$-cycloalkyl can be bound to the respective superordinate general structure via any desired and possible ring member of the cycloalkyl group. The —C$_{3-10}$-cycloalkyl and —C$_{3-6}$-cycloalkyl groups can also be condensed with further saturated, (partially) unsaturated, (hetero)cyclic, aromatic or heteroaromatic ring systems, i.e. with cycloalkyl, heterocyclyl, phenyl or heteroaryl residues, which in each case can in turn be unsubstituted or mono- or poly substituted. Further, —C$_{3-10}$-cycloalkyl and —C$_{3-6}$-cycloalkyl can be singly or multiply bridged such as, for example, in the case of adamantyl, bicyclo[2.2.1]heptyl or bicyclo[2.2.2]octyl. However, preferably, —C$_{3-10}$-cycloalkyl and —C$_{3-6}$-cycloalkyl are neither condensed with further ring systems nor bridged. More preferably, —C$_{3-10}$-cycloalkyl and —C$_{3-6}$-cycloalkyl are neither condensed with further ring systems nor bridged and are saturated. Preferred —C$_{3-10}$-cycloalkyl groups are selected from the group consisting of cyclopropyl, cyclobutyl, cyclopentyl, cyclohexyl, cyclopentenyl, cyclohexenyl, cycloheptyl, cyclooctyl, cyclononyl, cyclodecyl, adamantly, cyclopentenyl, cyclohexenyl, cycloheptenyl and cyclooctenyl. Particularly preferred —C$_{3-10}$-cycloalkyl groups are selected from —C$_{3-6}$-cycloalkyl groups.

Preferred —C$_{3-6}$-cycloalkyl groups are selected from the group consisting of cyclopropyl, cyclobutyl, cyclopentyl, cyclohexyl, cyclopentenyl and cyclohexenyl. Particularly preferred —C$_{3-6}$-cycloalkyl groups are selected from the group consisting of cyclopropyl, cyclobutyl, cyclopentyl and cyclohexyl, most preferably cyclopropyl and cyclobutyl.

According to the invention, the terms "3 to 7-membered heterocycloalkyl" and "3 to 6-membered heterocycloalkyl" preferably mean heterocycloaliphatic saturated or unsaturated (but not aromatic) residues having 3 to 7, i.e. 3, 4, 5, 6 or 7 ring members and 3 to 6, i.e. 3, 4, 5 or 6 ring members, respectively, wherein in each case at least one, if appropriate also two or three carbon atoms are replaced by a heteroatom or a heteroatom group each selected independently of one another from the group consisting of O, S, S(=O), S(=O)$_2$, N, NH and N(C$_{1-4}$-alkyl) such as N(CH$_3$), wherein the carbon atoms of the ring can be unsubstituted or mono- or polysubstituted. Preferably, the 3 to 7-membered heterocycloalkyl and the 3 to 6-membered heterocycloalkyl contain only one heteroatom or heteroatom group within the ring.

Preferably, 3 to 7-membered heterocycloalkyl and 3 to 6-membered heterocycloalkyl are saturated. The 3 to 7-membered heterocycloalkyl and the 3 to 6-membered heterocycloalkyl groups can also be condensed with further saturated or (partially) unsaturated cycloalkyl or heterocyclyl, aromatic or heteroaromatic ring systems. However, more preferably, 3 to 7-membered heterocycloalkyl and 3 to 6-membered heterocycloalkyl are not condensed with further ring systems. Still more preferably, 3 to 7-membered heterocycloalkyl and 3 to 6-membered heterocycloalkyl are not condensed with further ring systems and are saturated. The 3 to 7-membered heterocycloalkyl and the 3 to 6-membered heterocycloalkyl group can be bound to the superordinate general structure via any desired and possible ring member if not indicated otherwise. In a preferred embodiment, 3 to 7-membered heterocycloalkyl and 3 to 6-membered heterocycloalkyl are bound to the superordinate general structure via a carbon atom.

Preferred 3 to 7-membered heterocycloalkyl groups are selected from the group consisting of tetrahydropyranyl, oxetanyl, 2-pyridonyl, N-methylpyridonyl, tetrahydrofuranyl, azepanyl, dioxepanyl, oxazepanyl, diazepanyl, thiazolidinyl, tetrahydrothiophenyl, tetrahydropyridinyl, thiomorpholinyl, oxiranyl, morpholinyl, pyrrolidinyl, pyrrolidinonyl, 4-methylpiperazinyl, morpholinonyl, azetidinyl, aziridinyl, dithiolanyl, dihydropyrrolyl, dioxanyl, dioxolanyl, dihydropyridinyl, dihydrofuranyl, dihydroisoxazolyl, dihydrooxazolyl, imidazolidinyl, isoxazolidinyl, oxazolidinyl, piperazinyl, piperidinyl, pyrazolidinyl, pyranyl; tetrahydropyrrolyl, dihydroquinolinyl, dihydroisoquinolinyl, dihydroindolinyl, dihydroisoindolyl, tetrahydroquinolinyl, tetrahydroisoquinolinyl and tetrahydroindolinyl. Particularly preferred 3 to 7-membered heterocycloalkyl groups are selected from 3 to 6-membered heterocycloalkyl groups.

Preferred 3 to 6-membered heterocycloalkyl groups are selected from the group consisting of oxetanyl, oxiranyl, 2-pyridonyl, N-methylpyridonyl, tetrahydrofuranyl, tetrahydropyranyl, thiazolidinyl, tetrahydrothiophenyl, tetrahydropyridinyl, thiomorpholinyl, morpholinyl, pyrrolidinyl, pyrrolidinonyl, 4-methylpiperazinyl, morpholinonyl, azetidinyl, aziridinyl, dithiolanyl, dihydropyrrolyl, dioxanyl, dioxolanyl, dihydropyridinyl, dihydrofuranyl, dihydroisoxazolyl, dihydrooxazolyl, imidazolidinyl, isoxazolidinyl, oxazolidinyl, piperazinyl, piperidinyl, pyrazolidinyl, pyranyl, tetrahydropyrrolyl, dihydroindolinyl, dihydroisoindolyl and tetrahydroindolinyl. More preferred 3 to 6-membered heterocycloalkyl groups are selected from the group consisting of N-methylpyridonyl, oxetanyl, and oxiranyl.

According to the invention, the term "5- to 6-membered heteroaryl" preferably means a 5 or 6-membered cyclic aromatic residue containing at least 1, if appropriate also 2, 3, 4 or 5 heteroatoms, wherein the heteroatoms are each selected independently of one another from the group S, N and O and the heteroaryl residue can be unsubstituted or mono- or poly substituted, if not indicated otherwise. In the case of substitution on the heteroaryl, the substituents can be the same or different and be in any desired and possible position of the heteroaryl. The binding to the superordinate general structure can be carried out via any desired and possible ring member of the heteroaryl residue if not indicated otherwise. Preferably, the 5- to 6-membered heteroaryl is bound to the suprordinate general structure via a carbon atom of the heterocycle. The heteroaryl can also be part of a bi- or polycyclic system having up to 14 ring members, wherein the ring system can be formed with further saturated or (partially) unsaturated cycloalkyl or heterocycloalkyl, aromatic or heteroaromatic ring systems, which can in turn be unsubstituted or mono- or polysubstituted, if not indicated otherwise. In a preferred embodiment, the 5- to 6-membered heteroaryl is part of a bi- or polycyclic, preferably bicyclic, system. In another preferred embodiment, the 5- to 6-membered heteroaryl is not part of a bi- or polycyclic system.

Preferably, the 5- to 6-membered heteroaryl is selected from the group consisting of pyridyl (i.e. 2-pyridyl, 3-pyridyl, 4-pyridyl), pyrimidinyl, pyrazolyl, N-methylpyrazolyl, thiazolyl, pyridonyl, N-methylpyridonyl, oxadiazolyl, indazolyl, indolyl, oxazolyl, isoxazolyl, pyridazinyl, pyrazinyl, pyrrolyl, imidazolyl, isothiazolyl, furanyl, thienyl (thiophenyl), triazolyl, thiadiazolyl, 4,5,6,7-tetrahydro-2H-indazolyl, 2,4,5,6-tetrahydrocyclopenta[c]pyrazolyl, benzofuranyl, benzoimidazolyl, benzothienyl, benzothiadiazolyl, benzothiazolyl, benzotriazolyl, benzooxazolyl, benzooxadiazolyl, quinazolinyl, quinoxalinyl, carbazolyl, quinolinyl, dibenzofuranyl, dibenzothienyl, imidazothiazolyl, indolizinyl, isoquinolinyl, naphthyridinyl, oxazolyl, phenazinyl, phenothiazinyl, phthalazinyl, purinyl, phenazinyl, tetrazolyl and triazinyl. Particularly preferred 5- to 6-membered heteroaryl are selected from the group consisting of pyridyl (i.e. 2-pyridyl, 3-pyridyl, 4-pyridyl), pyrimidinyl, pyrazolyl, N-methylpyrazolyl, thiazolyl, pyridonyl, N-methylpyridonyl, oxadiazolyl, indazolyl, and indolyl. As pyridones can be regarded as pyridines that are substituted with =O, for the purpose of the specification the definition of pyridines that may optionally be substituted with =O covers pyridones.

The compounds according to the invention are defined by substituents, for example by $R^1$, $R^2$ and $R^3$ ($1^{st}$ generation substituents) which may optionally be for their part themselves be substituted ($2^{nd}$ a generation substituents). Depending on the definition, these substituents of the substituents can optionally be for their part resubstituted ($3^{rd}$ generation substituents). If, for example, $R^1$=phenyl ($1^{st}$ generation substituent), then the phenyl can for its part be substituted, for example with —$C_{1-6}$-alkyl ($2^{nd}$ a generation substituent). This produces the functional group $R^1$=phenyl-$C_{1-6}$-alkyl. The —$C_{1-6}$-alkyl can then for its part be resubstituted, for example with —F ($3^{rd}$ generation substituent). Overall, this produces the functional group $R^1$=phenyl-$C_{1-6}$-alkyl, wherein the —$C_{1-6}$-alkyl is substituted with —F.

However, in a preferred embodiment, the $3^{rd}$ generation substituents may not be resubstituted, i.e. there are then no $4^{th}$ generation substituents. More preferably, the $2^{nd}$ a generation substituents may not be resubstituted, i.e. there are no $3^{rd}$ generation substituents.

If a residue occurs multiply within a molecule, then this residue can have respectively different meanings for various substituents: if, for example, both $R^3$ and $R^{3'}$ denote —$C_{1-10}$-alkyl, then —$C_{1-10}$-alkyl can e.g. represent ethyl for $R^3$ and can represent methyl for $R^{3'}$.

In connection with the terms "—$C_{1-10}$-alkyl", "—$C_{1-6}$-alkyl", "—$C_{1-4}$-alkyl", "—$C_{3-10}$-cycloalkyl", "—$C_{3-6}$-cycloalkyl", "3 to 7 membered heterocycloalkyl", "3 to 6-membered heterocycloalkyl", "—$C_{1-6}$-alkylene-", "—$C_{1-4}$-alkylene-" and "—$C_{1-2}$-alkylene-", the term "substituted" refers in the sense of the invention, with respect to the corresponding residues or groups, to the single substitution (monosubstitution) or multiple substitution (polysubstitution), e.g. disubstitution or trisubstitution; more preferably to monosubstitution or disubstitution; of one or more hydrogen atoms each independently of one another by at least one substituent. In case of a multiple substitution, i.e. in case of polysubstituted residues, such as di- or trisubstituted residues, these residues may be poly substituted either on different or on the same atoms, for example trisubstituted on the same carbon atom, as in the case of —$CF_3$, —$CH_2CF_3$ or disubstituted as in the case of 1,1-difluorocyclohexyl, or at various points, as in the case of —CH(OH)—CH=CH—$CHCl_2$ or 1-chloro-3-fluorocyclohexyl. The multiple substitution can be carried out using the same or using different substituents.

In relation to the terms "phenyl" and "5- to 6-membered heteroaryl", the term "substituted" refers in the sense of this invention to the single substitution (monosubstitution) or multiple substitution (poly substitution), e.g. disubstitution or trisubstitution, of one or more hydrogen atoms each independently of one another by at least one substituent. The multiple substitution can be carried out using the same or using different substituents. According to the invention, preferably —$C_{1-10}$-alkyl-, —$C_{1-6}$-alkyl, —$C_{1-4}$-alkyl, —$C_{3-10}$-cycloalkyl, —$C_{3-6}$-cycloalkyl, 3 to 7 membered heterocycloalkyl, 3 to 6-membered heterocycloalkyl, —$C_{1-6}$-alkylene-, —$C_{1-4}$-alkylene- and —$C_{1-2}$-alkylene- in each case independently from one another are unsubstituted or mono- or polysubstituted with one or more substituents selected from —F; —Cl; —Br; —I; —CN; —$C_{1-6}$-alkyl; —$CF_3$; —$CF_2H$; —$CFH_2$; —$CF_2Cl$; —$CFCl_2$; —C(=O)—$C_{1-6}$-alkyl; —C(=O)—OH; —C(=O)—O$C_{1-6}$-alkyl; —C(=O)—$NH_2$; —C(=O)—NH($C_{1-6}$-alkyl); —C(=O)—N($C_{1-6}$-alkyl)$_2$; —OH; —$OCF_3$; —$OCF_2H$; —$OCFH_2$; —$OCF_2Cl$; —$OCFCl_2$; —O—$C_{1-6}$-alkyl; —O—C(=O)—$C_{1-6}$-alkyl; —O—C(=O)—O—$C_{1-6}$-alkyl; —O—(CO)—NH($C_{1-6}$-alkyl); —O—C(=O)—N($C_{1-6}$-alkyl)$_2$; —O—S(=O)$_2$—$NH_2$; —O—S(=O)$_2$—NH($C_{1-6}$-alkyl); —O—S(=O)$_2$—N($C_{1-6}$-alkyl)$_2$; —$NH_2$; —NH($C_{1-6}$-alkyl); —N($C_{1-6}$-alkyl)$_2$; —NH—C(=O)—$C_{1-6}$-alkyl; —NH—C(=O)—O—$C_{1-6}$-alkyl; —NH—C(=O)—$NH_2$; —NH—C(=O)—NH($C_{1-6}$-alkyl); —NH—C(=O)—N($C_{1-6}$-alkyl)$_2$; —N($C_{1-6}$-alkyl)-C(=O)—$C_{1-6}$-alkyl; —N($C_{1-6}$-alkyl)-C(=O)—O—$C_{1-6}$-alkyl; —N($C_{1-6}$-alkyl)-C(=O)—$NH_2$; —N($C_{1-6}$-alkyl)-C(=O)—NH($C_{1-6}$-alkyl); —N($C_{1-6}$-alkyl)-C(=O)—N($C_{1-6}$-alkyl)$_2$; —NH—S(=O)$_2$OH; NH—S(=O)$_2$—$C_{1-6}$-alkyl; —NH—S(=O)$_2$—O—$C_{1-6}$-alkyl; —NH—S(=O)$_2$—$NH_2$; —NH—S(=O)$_2$—NH($C_{1-6}$-alkyl); —NH—S(=O)$_2$N($C_{1-6}$-alkyl)$_2$; —N($C_{1-6}$-alkyl)-S(=O)$_2$—OH; —N($C_{1-6}$-alkyl)-S(=O)$_2$—$C_{1-6}$-alkyl; —N($C_{1-6}$-alkyl)-S(=O)$_2$—O—$C_{1-6}$-alkyl; —N($C_{1-6}$-alkyl)-S(=O)$_2$—$NH_2$; —N($C_{1-6}$-alkyl)-S(=O)$_2$—NH($C_{1-6}$-alkyl); —N($C_{1-6}$-alkyl)-S(=O)$_2$—N($C_{1-6}$-alkyl)$_2$; —$SCF_3$; —$SCF_2H$; —$SCFH_2$; —S—$C_{1-6}$-alkyl; —S(=O)—$C_{1-6}$-alkyl; —S(=O)$_2$—$C_{1-6}$-alkyl; —S(=O)$_2$—OH; —S(=O)$_2$—O—$C_{1-6}$-alkyl; —S(=O)$_2$—$NH_2$; —S(=O)$_2$—NH($C_{1-6}$-alkyl); —S(=O)$_2$—N($C_{1-6}$-alkyl)$_2$; —$C_{3-6}$-cycloalkyl; 3 to 6-membered heterocycloalkyl; phenyl; 5 or 6-membered heteroaryl; —O—$C_{3-6}$-cycloalkyl; —O-(3 to 6-membered heterocycloalkyl); —O-phenyl; —O-(5 or 6-membered heteroaryl); —C(=O)—$C_{3-6}$-cycloalkyl; —C(=O)-(3 to 6-membered heterocycloalkyl); —C(=O)-phenyl; —C(=O)-(5 or 6-membered heteroaryl); —S(=O)$_2$—($C_{3-6}$-cycloalkyl); —S(=O)$_2$-(3 to 6-membered heterocycloalkyl); —S(=O)$_2$-phenyl and —S(=O)$_2$-(5 or 6-membered heteroaryl).

Preferred substituents of —$C_{1-10}$-alkyl, —$C_{1-6}$-alkyl, —$C_{1-4}$-alkyl, —$C_{3-10}$-cycloalkyl, —$C_{3-6}$-cycloalkyl, 3 to 7 membered heterocycloalkyl, 3 to 6-membered heterocycloalkyl, —$C_{1-6}$-alkylene- and —$C_{1-4}$-alkylene- are selected from the group consisting of —F; —Cl; —Br; —I; —CN; —$C_{1-6}$-alkyl; —$CF_3$; —$CF_2H$; —$CFH_2$; —C(=O)—$NH_2$; —C(=O)—NH($C_{1-6}$-alkyl); —C(=O)—N($C_{1-6}$-alkyl)$_2$; —OH; —$OCF_3$; —$OCF_2H$; —$OCFH_2$; —O—$C_{1-6}$-alkyl; —$NH_2$; —NH($C_{1-6}$-alkyl); —N($C_{1-6}$-alkyl)$_2$; —S(=O)—$C_{1-6}$-alkyl; —S(=O)$_2$—$C_{1-6}$-alkyl; —$C_{3-6}$-cycloalkyl; 3 to 6-membered heterocycloalkyl; phenyl and 5 or 6-membered heteroaryl; and particularly preferably —F, —CN, —$CH_3$, —$CH_2CH_3$, —$CF_3$; —$CF_2H$; —$CFH_2$; —C(=O)—$NH_2$; —C(=O)—NH($CH_3$); —C(=O)—N($CH_3$)$_2$; —OH, —$NH_2$, —$OCH_3$, —S(=O)$_2$($CH_3$), —S(=O)($CH_3$), —N($CH_3$)$_2$, cyclopropyl and oxetanyl. According to this embodiment, —$C_{1-10}$-alkyl, —$C_{1-6}$-alkyl, —$C_{1-4}$-alkyl, —$C_{3-10}$-cycloalkyl, —$C_{3-6}$-cycloalkyl, 3 to 7 membered heterocycloalkyl, 3 to 6-membered heterocycloalkyl are preferably each independently from one another unsubstituted, mono- di- or trisubstituted, more preferably unsubstituted or monosubstituted or disubstituted with a substituent selected from the group consisting of —F; —Cl; —Br; —I; —CN; —$C_{1-6}$-alkyl; —$CF_3$; —$CF_2H$; —$CFH_2$; —C(=O)—$NH_2$; —C(=O)—NH($C_{1-6}$-alkyl); —C(=O)—N($C_{1-6}$-alkyl)$_2$; —OH; —$OCF_3$; —$OCF_2H$; —$OCFH_2$; —O—$C_{1-6}$-alkyl; —$NH_2$; —NH($C_{1-6}$-alkyl); —N($C_{1-6}$-alkyl)$_2$; —S(=O)—$C_{1-6}$-alkyl; —S(=O)$_2$—$C_{1-6}$-alkyl; —$C_{3-6}$-cycloalkyl; 3 to 6-membered heterocycloalkyl; phenyl and 5 or 6-membered heteroaryl; more preferably —F; —Cl; —Br; —CN; —$C_{1-6}$-alkyl; —$CF_3$; —$CF_2H$; —$CFH_2$; —OH; —$OCF_3$; —$OCF_2H$; and —$OCFH_2$; and particularly preferably —F; —Cl; —Br; and —$CH_3$. Preferably, —$C_{1-6}$-alkylene- groups and —$C_{1-4}$-alkylene- groups are unsubstituted.

According to the invention, preferably phenyl and 5 or 6-membered heteroaryl in each case independently from one another are unsubstituted or mono- or polysubstituted; preferably unsubstituted, mono- di- or trisubstituted, still more preferably unsubstituted or monosubstituted or disubstituted; with one or more substituents selected from —F; —Cl; —Br; —I; —CN; —$C_{1-6}$-alkyl; —$CF_3$; —$CF_2H$; —$CFH_2$; —$CF_2Cl$; —$CFCl_2$; —$C_{1-4}$-alkylene-$CF_3$; —$C_{1-4}$-alkylene-$CF_2H$; —$C_{1-4}$-alkylene-$CFH_2$; —C(=O)—$C_{1-6}$-alkyl; —C(=O)—OH; —C(=O)—O$C_{1-6}$-alkyl; —C(=O)—NH(OH); —C(=O)—$NH_2$; —C(=O)—NH($C_{1-6}$-alkyl); —C(=O)—N($C_{1-6}$-alkyl)$_2$; —OH; =O; —$OCF_3$; —$OCF_2H$; —$OCFH_2$; —$OCF_2Cl$; —$OCFCl_2$; —O—$C_{1-6}$-alkyl; —O—$C_{3-6}$-cycloalkyl; —O-(3 to 6-membered heterocycloalkyl); —O-phenyl; —O-(5 or 6-membered heteroaryl); —$NH_2$; —NH($C_{1-6}$-alkyl); —N($C_{1-6}$-alkyl)$_2$; —NH—C(=O)—$C_{1-6}$-alkyl; —N($C_{1-6}$-alkyl)-C(=O)—$C_{1-6}$-alkyl; —NH—C(=O)—$NH_2$; —NH—C(=O)—NH($C_{1-6}$-alkyl); —NH—C(=O)—N($C_{1-6}$-alkyl)$_2$; —N($C_{1-6}$-alkyl)-C(=O)—NH($C_{1-6}$-alkyl); —N($C_{1-6}$-alkyl)-C(=O)—N($C_{1-6}$-alkyl)$_2$; —NH—S(=O)$_2$—$C_{1-6}$-alkyl; —$SCF_3$; —S—$C_{1-6}$-alkyl; —S(=O)—$C_{1-6}$-alkyl; —S(=O)$_2$—$C_{1-6}$-alkyl; —S(=O)$_2$—$NH_2$; —S(=O)$_2$—NH($C_{1-6}$-alkyl); —S(=O)$_2$—N($C_{1-6}$-alkyl)$_2$; —$C_{3-6}$-cycloalkyl; —$C_{1-4}$-alkylene-$C_{3-6}$-cycloalkyl; 3 to 6-membered heterocycloalkyl; —$C_{1-4}$-alkylene-(3 to 6-membered heterocycloalkyl); phenyl and 5 or 6-membered heteroaryl.

Preferred substituents of phenyl and 5 or 6-membered heteroaryl are selected from the group consisting of —F; —Cl; —Br; —I; —CN; —$C_{1-6}$-alkyl; —$CF_3$; —$CF_2H$; —$CFH_2$; —$C_{1-4}$-alkylene-$CF_3$; —$C_{1-4}$-alkylene-$CF_2H$; —$C_{1-4}$-alkylene-$CFH_2$; —OH; =O; —$OCF_3$; —$OCF_2H$; —$OCFH_2$; —O—$C_{1-6}$-alkyl; —O—$C_{3-6}$-cycloalkyl; —$C_{3-6}$-cycloalkyl; and —S(=O)$_2$—$C_{1-6}$-alkyl; and more preferably of —F; —Cl; —Br; —CN; —$CH_3$; —$CH_2CH_3$; —$CF_3$; —$CF_2H$; —$CFH_2$; —$CH_2$—$CF_3$; —OH; =O; —$OCF_3$; —$OCF_2H$; —$OCFH_2$; —O—$CH_3$; —O-cyclopropyl; cyclopropyl; and —S(=O)$_2$—$CH_3$; still more preferably —F; —Cl; —Br; —$CH_3$; —$CH_2CH_3$; —$CF_3$; —$CF_2H$; —$CFH_2$; —OH; =O; —$OCF_3$; —O—$CH_3$; and —S(=O)$_2$—$CH_3$; and particularly preferably preferably —F; —Cl; —Br; —$CH_3$; —O—$CH_3$; =O; and —S(=O)$_2$—$CH_3$. According to this embodiment, phenyl and 5 or 6-membered heteroaryl are preferably each independently from one another unsubstituted, mono- di- or trisubstituted, more preferably unsubstituted or monosubstituted or disubstituted with a substituent selected from the group consisting of —F; —Cl; —Br; —I; —CN; —$C_{1-6}$-alkyl; —$CF_3$; —$CF_2H$; —$CFH_2$; —$C_{1-4}$-alkylene-$CF_3$; —$C_{1-4}$-alkylene-$CF_2H$; —$C_{1-4}$-alkylene-$CFH_2$; —OH; =O; —$OCF_3$; —$OCF_2H$; —$OCFH_2$; —O—$C_{1-6}$-alkyl; —O—$C_{3-6}$-cycloalkyl;

—$C_{3-6}$-cycloalkyl; and —$S(=O)_2$—$C_{1-6}$-alkyl. A preferred substituted 5 or 6-membered heteroaryl is N-methyl-2-oxo-pyridyl.

In a preferred embodiment, the compound according to the invention has a stereochemistry according to general formula (II), (III), (IV), (V), (VI), (VII), (VIII) or (IX):

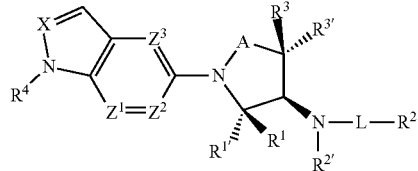
(II)

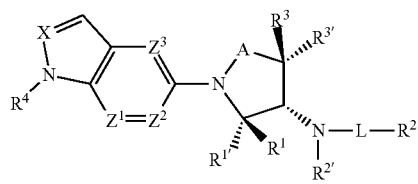
(III)

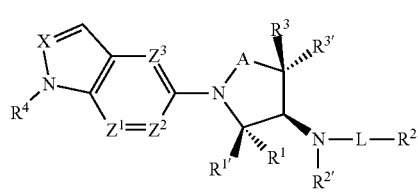
(IV)

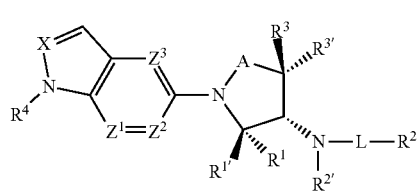
(V)

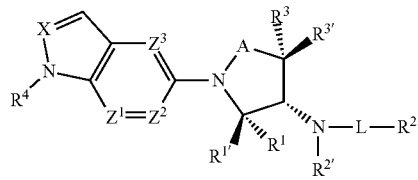
(VI)

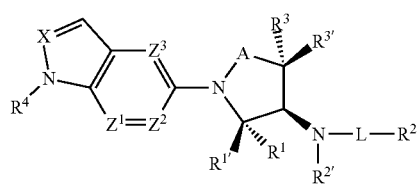
(VII)

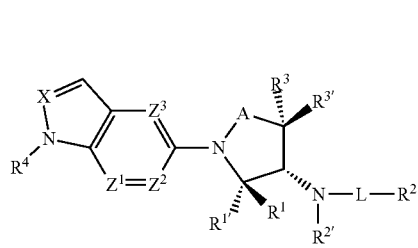
(VIII)

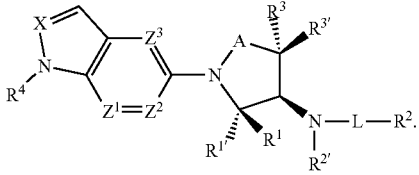
(IX)

In a preferred embodiment, the compound according to the invention has a stereochemistry according to general formula (III), (IV), (VII) or (VIII), such that the residues —$R^1$ and —$N(R^{2'})(L\text{-}R^2)$ are oriented trans. More preferably, the compound according to the invention has a stereochemistry according to general formula (III) or (VIII).

In another preferred embodiment, the compound according to the invention has a stereochemistry according to general formula (II), (V), (VI) or (IX), such that the residues —$R^1$ and —$N(R^{2'})(L\text{-}R^2)$ are oriented cis. However, most preferably, the residues —$R^1$ and —$N(R^{2'})(L\text{-}R^2)$ are oriented trans.

In the compound of the invention according to any of general formulas (I) to (IX) A represents C=O or $S(=O)_2$; more preferably C=O.

In the compound of the invention according to any of general formulas (I) to (IX) $R^1$ represents phenyl; —$C_{1-6}$-alkylene-phenyl; 5 or 6-membered heteroaryl; or —$C_{1-6}$-alkylene-(5 or 6-membered heteroaryl). More preferably, $R^1$ represents phenyl; still more preferably, $R^1$ represents unsubstituted phenyl.

In the compound of the invention according to any of general formulas (I) to (IX), $R^{1'}$ represents H; or —$C_{1-10}$-alkyl. More preferably, $R^{1'}$ represents H.

Further, in the compound of the invention according to any of general formulas (I) to (IX), L represents bond; —$C_{1-6}$-alkylene; C=O; or $S(O)_2$; wherein if A represents C=O, L neither represents C=O nor $S(O)_2$. More preferably, L represents bond, methylene or ethylene; most preferably bond or methylene.

Still further, in the compound of the invention according to any of general formulas (I) to (IX), $R^2$ represents —$C_{1-10}$-alkyl; —$C_{3-10}$-cycloalkyl; 3 to 7 membered heterocycloalkyl; phenyl; or 5 or 6-membered heteroaryl.

More preferably, $R^2$ represents
(i) —$C_{1-10}$-alkyl selected from the group consisting of methyl, ethyl, n-propyl and 2-propyl; wherein said methyl, ethyl, n-propyl and 2-propyl can be unsubstituted, monosubstituted or disubstituted with a substituent selected from the group consisting of —F, —$C_1$, —OH, —CN and —$CF_3$;
(ii) —$C_{3-10}$-cycloalkyl selected from the group consisting of cyclopropyl; cyclobutyl; cyclopentyl and cyclohexyl;
(iii) 3 to 7 membered heterocycloalkyl selected from the group consisting of oxetanyl; tetrahydropyranyl; tetrahydrofuranyl; oxiranyl; tetrahydropyridinyl; morpholinyl; pyrrolidinyl; and piperidinyl;
(iv) phenyl; or
(v) 5 or 6-membered heteroaryl selected from the group consisting of pyridinyl; pyrimidinyl; pyrazolyl; thiazolyl; pyridonyl; N-methylpyridonyl; pyridazinyl; pyrazinyl; imidazolyl; oxazolyl; isoxazolyl; isothiazolyl; furanyl; thienyl; and triazolyl; wherein said pyridinyl; pyrimidinyl; pyrazolyl; thiazolyl; pyridonyl; N-methylpyridonyl; pyridazinyl; pyrazinyl; imidazolyl; oxazolyl; isoxazolyl; isothiazolyl; furanyl; thienyl; and triazolyl can be unsubstituted, monosubstituted or disubstituted with a substituent selected from the group consisting of —F, —Cl, —CH$_3$, —OH, —CN and —CF$_3$.

Still more preferably, R$^2$ represents phenyl; cyclopropyl; oxetanyl; tetrahydropyranyl; pyridinyl; pyrimidinyl; pyrazolyl; N-methylpyrazolyl; thiazolyl; or difluoroethane.

Still further, in the compound of the invention according to any of general formulas (I) to (IX), R$^{2'}$ represents H; or —C$_{1-10}$-alkyl; —C$_{3-10}$-cycloalkyl; or —C$_{1-6}$-alkylene-C$_{3-10}$-cycloalkyl. More preferably, R$^{2'}$ represents H; —C$_{3-10}$-cycloalkyl; or —C$_{1-6}$-alkylene-C$_{3-10}$-cycloalkyl. Most preferably, R$^{2'}$ represents H; cyclopropyl; or —CH$_2$—cyclopropyl.

Still further, in the compound of the invention according to any of general formulas (I) to (IX), R$^3$ and R$^{3'}$ independently from one another represent H; or —C$_{1-10}$-alkyl; or R$^3$ and R$^{3'}$ together with the carbon atom to which they are bound form a C$_{3-10}$-cycloalkyl; or 3 to 7 membered heterocycloalkyl.

More preferably, R$^3$ and R$^{3'}$ independently from one another represent H; or —CH$_3$; or R$^3$ and R$^{3'}$ together with the carbon atom to which they are bound form cyclopropyl, cyclobutyl; oxiranyl; or oxetanyl. Most preferably, R$^3$ and R$^{3'}$ independently from one another represent H; or —CH$_3$.

Still further, in the compound of the invention according to any of general formulas (I) to (IX), R$^4$ represents phenyl; or 5 or 6-membered heteroaryl. More preferably, R$^4$ represents phenyl; fluoro-phenyl; pyridonyl; or N-methylpyridonyl; most preferably fluorophenyl or N-methylpyridonyl.

Still further, in the compound of the invention according to any of general formulas (I) to (IX), X represents N or CH. More preferably, X represents N.

Still further, in the compound of the invention according to any of general formulas (I) to (IX), Z$^1$, Z$^2$ and Z$^3$ each independently from one another represent N or CH. More preferably, Z$^1$, Z$^2$ and Z$^3$ represent CH.

In a particularly preferred embodiment,
A represents C=O; and/or
R$^1$ represents phenyl; and/or
R$^{1'}$ represents H; and/or
L represents bond or methylene; and/or
R$^{2'}$ represents H or —CH$_2$-cyclopropyl; and/or
R$^3$ represents H or CH$_3$; and/or
R$^{3'}$ represents H or CH$_3$; and/or
R$^4$ represents fluoro-phenyl or N-methylpyridonyl; and/or
X represents N; and/or
Z$^1$, Z$^2$ and Z$^3$ each represent CH.

In another preferred embodiment, the compound is selected from the group consisting of
1    (4S,5R)-4-((cyclopropylmethyl)amino)-1-(1-(4-fluorophenyl)-1H-indazol-5-yl)-3,3-dimethyl-5-phenylpyrrolidin-2-one
2    (4S,5R)-4-((cyclopropylmethyl)amino)-1-(1-(4-fluorophenyl)-1H-indazol-5-yl)-5-phenylpyrrolidin-2-one
3 (4S,5R)-4-(bis(cyclopropylmethyl)amino)-1-(1-(4-fluorophenyl)-1H-indazol-5-yl)-5-phenylpyrrolidin-2-one
4    rac-(3R,4R,5S)-4-(cyclopropylmethylamino)-1-[1-(4-fluorophenyl)indazol-5-yl]-3-methyl-5-phenylpyrrolidin-2-one
5 (4S,5R)-1-(1-(4-fluorophenyl)-1H-indazol-5-yl)-3,3-dimethyl-5-phenyl-4-((pyrimidin-2-ylmethyl)amino)pyrrolidin-2-one
6    (4S,5R)-1-(1-(4-fluorophenyl)-1H-indazol-5-yl)-5-phenyl-4-((pyrimidin-2-ylmethyl)amino)pyrrolidin-2-one
7    rac-(3R,4R,5S)-1-[1-(4-fluorophenyl)indazol-5-yl]-3-methyl-5-phenyl-4-(pyrimidin-2-ylmethylamino)pyrrolidin-2-one
8 (4S,5R)-1-(1-(4-fluorophenyl)-1H-indazol-5-yl)-3,3-dimethyl-4-(((1-methyl-1H-pyrazol-3-yl)methyl)amino)-5-phenylpyrrolidin-2-one
9 (4S,5R)-1-(1-(4-fluorophenyl)-1H-indazol-5-yl)-3,3-dimethyl-4-((oxetan-3-ylmethyl)amino)-5-phenylpyrrolidin-2-one
10 (4S,5R)-1-(1-(4-fluorophenyl)-1H-indazol-5-yl)-3,3-dimethyl-5-phenyl-4-(((tetrahydro-2H-pyran-4-yl)methyl)amino)pyrrolidin-2-one
11 rac-(3R,4R,5S)-4-(benzylamino)-1-[1-(4-fluorophenyl)indazol-5-yl]-3-methyl-5-phenylpyrrolidin-2-one
12 (4S,5R)-1-(1-(4-fluorophenyl)-1H-indazol-5-yl)-5-phenyl-4-(thiazol-2-ylamino)pyrrolidin-2-one
13 (4S,5R)-1-(1-(4-fluorophenyl)-1H-indazol-5-yl)-5-phenyl-4-(pyridin-2-ylamino)pyrrolidin-2-one
14 (4S,5R)-1-(1-(4-fluorophenyl)-1H-indazol-5-yl)-5-phenyl-4-(pyrimidin-2-ylamino)pyrrolidin-2-one
15 (4S,5R)-1-(1-(4-fluorophenyl)-1H-indazol-5-yl)-3,3-dimethyl-5-phenyl-4-(pyrimidin-2-ylamino)pyrrolidin-2-one
16    5-(5-((4S,5R)-4-((cyclopropylmethyl)amino)-3,3-dimethyl-2-oxo-5-phenylpyrrolidin-1-yl)-1H-indazol-1-yl)-1-methylpyridin-2(1H)-one
17    5-(5-((2R,3S)-3-((cyclopropylmethyl)amino)-5-oxo-2-phenylpyrrolidin-1-yl)-1H-indazol-1-yl)-1-methylpyridin-2(1H)-one
18    5-(5-((2R,3S)-3-(bis(cyclopropylmethyl)amino)-5-oxo-2-phenylpyrrolidin-1-yl)-1H-indazol-1-yl)-1-methylpyridin-2(1H)-one
19    1-methyl-5-(5-((2R,3S)-5-oxo-2-phenyl-3-((pyrimidin-2-ylmethyl)amino)pyrrolidin-1-yl)-1H-indazol-1-yl)pyridin-2(1H)-one
20    (4S,5R)-4-((cyclopropylmethyl)amino)-1-(1-(4-fluorophenyl)-1H-pyrazolo[4,3-b]pyridin-5-yl)-3,3-dimethyl-5-phenylpyrrolidin-2-one
21    (4S,5R)-4-((cyclopropylmethyl)amino)-1-(1-(4-fluorophenyl)-1H-pyrazolo[3,4-b]pyridin-5-yl)-3,3-dimethyl-5-phenylpyrrolidin-2-one
22    5-(5-((4S,5R)-3,3-dimethyl-2-oxo-5-phenyl-4-(pyrimidin-2-ylamino)pyrrolidin-1-yl)-1H-indazol-1-yl)-1-methylpyridin-2(1H)-one
23 1-methyl-5-(5-((2R,3S)-5-oxo-2-phenyl-3-(pyrimidin-2-ylamino)pyrrolidin-1-yl)-1H-indazol-1-yl)pyridin-2(1H)-one
24   5-(5-((4S,5R)-3,3-dimethyl-2-oxo-5-phenyl-4-(thiazol-2-ylamino)pyrrolidin-1-yl)-1H-indazol-1-yl)-1-methylpyridin-2(1H)-one
25    1-methyl-5-(5-((2R,3S)-5-oxo-2-phenyl-3-(thiazol-2-ylamino)pyrrolidin-1-yl)-1H-indazol-1-yl)pyridin-2(1H)-one
26    (4S,5R)-4-((cyclopropylmethyl)amino)-1-(1-(4-fluorophenyl)-1H-pyrazolo[3,4-c]pyridin-5-yl)-3,3-dimethyl-5-phenylpyrrolidin-2-one
27    (4S,5R)-4-((cyclopropylmethyl)amino)-1-(1-(4-fluorophenyl)-1H-indol-5-yl)-3,3-dimethyl-5-phenylpyrrolidin-2-one
28 N-((3R,4R)-2-(1-(4-fluorophenyl)-1H-indazol-5-yl)-5,5-dimethyl-1,1-dioxido-3-phenylisothiazolidin-4-yl)cyclopropanecarboxamide
29 N-((3R,4R)-2-(1-(4-fluorophenyl)-1H-indazol-5-yl)-1,1-dioxido-3-phenylisothiazolidin-4-yl)cyclopropanecarboxamide 30 2,2-difluoro-N-((3R,4R)-2-(1-(4-fluorophenyl)-1H-indazol-5-yl)-5,5-dimethyl-1,1-dioxido-3-phenylisothiazolidin-4-yl)propanamide
31 2,2-difluoro-N-((3R,4R)-2-(1-(4-fluorophenyl)-1H-indazol-5-yl)-1,1-dioxido-3-phenylisothiazolidin-4-yl)propanamide
32 N-((3R,4R)-2-(1-(4-fluorophenyl)-1H-indazol-5-yl)-1,1-dioxido-3-phenylisothiazolidin-4-yl)cyclopropanesulfonamide
33 N-((3R,4R)-2-(1-(4-fluorophenyl)-1H-indazol-5-yl)-1,1-dioxido-3-phenylisothiazolidin-4-yl)-1-methyl-1H-pyrazole-3-carboxamide 34 N-((3R,4R)-5,5-dimethyl-2-(1-(1-methyl-6-oxo-1,6-dihydropyridin-3-yl)-1H-indazol-5-yl)-1,1-dioxido-3-phenylisothiazolidin-4-yl)cyclopropanecarboxamide
35 N-((3R,4R)-2-(1-(1-methyl-6-oxo-1,6-dihydropyridin-3-yl)-1H-indazol-5-yl)-1,1-dioxido-3-phenylisothiazolidin-4-yl)cyclopropanecarboxamide
36 N-((3R,4R)-5,5-dimethyl-2-(1-(1-methyl-6-oxo-1,6-dihydropyridin-3-yl)-1H-indazol-5-yl)-1,1-dioxido-3-phenylisothiazolidin-4-yl)-2,2-difluoropropanamide
37 2,2-difluoro-N-((3R,4R)-2-(1-(1-methyl-6-oxo-1,6-dihydropyridin-3-yl)-1H-indazol-5-yl)-1,1-dioxido-3-phenylisothiazolidin-4-yl)propanamide
38 N-((3R,4R)-2-(1-(1-methyl-6-oxo-1,6-dihydropyridin-3-yl)-1H-indazol-5-yl)-1,1-dioxido-3-phenylisothiazolidin-4-yl)cyclopropanesulfonamide
39 1-methyl-N-((3R,4R)-2-(1-(1-methyl-6-oxo-1,6-dihydropyridin-3-yl)-1H-indazol-5-yl)-1,1-dioxido-3-phenylisothiazolidin-4-yl)-1H-pyrazole-3-carboxamide in the form of the free compound or a physiologically acceptable salt thereof.

The compounds according to the invention can be synthesized by standard reactions in the field of organic chemistry known to the person skilled in the art or in a manner as described herein (cf. Reaction Schemes below) or analogously. The reaction conditions in the synthesis routes described herein are known to the skilled person and are for some cases also exemplified in the Examples described herein.

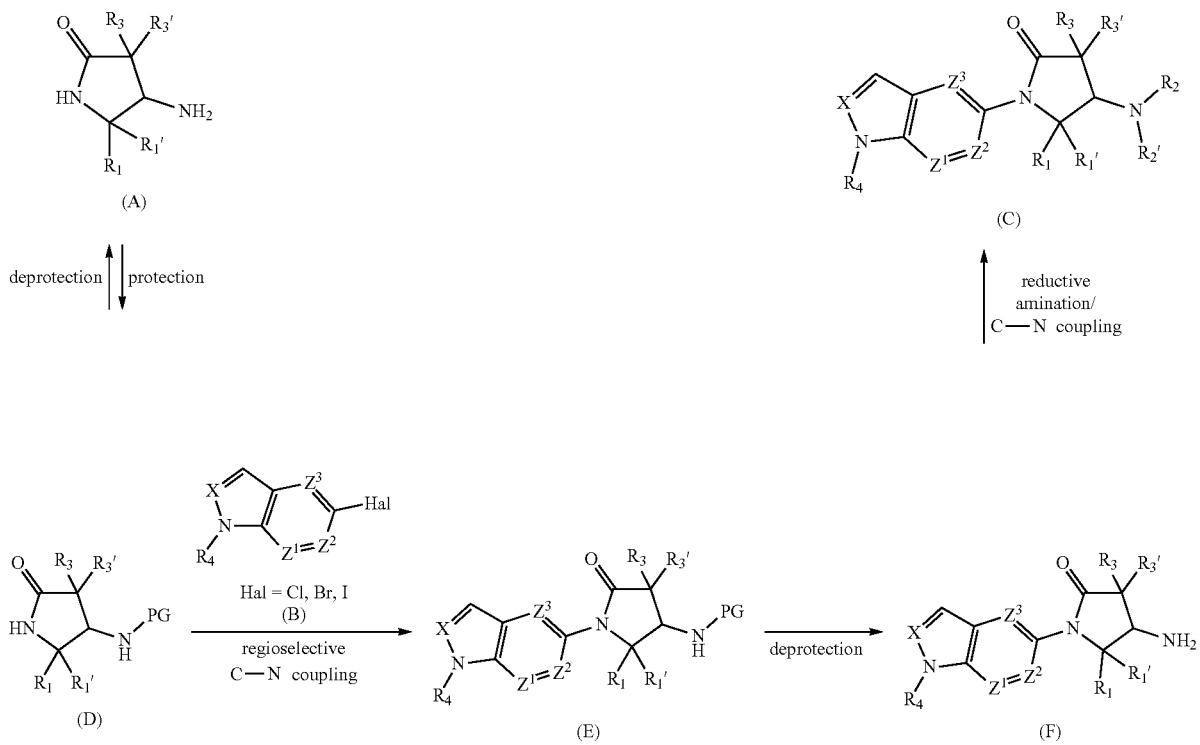

Reaction scheme 1

Substituted indazole or indole moieties in compounds of formula (E) are introduced by subjecting lactam (D) in a regioselective metal-catalyzed C—N coupling reaction with corresponding indazole or indole halides (B), preferred with corresponding indazole iodides. Metal catalyzed C—N coupling reactions are generally known in the art (*Current Organic Synthesis*, 2011, 8, 53). Favorable C—N coupling reactions are palladium and copper catalyzed cross-coupling reactions (*Chem. Rev.*, 2016, 116, 12564; *Chem. Soc. Rev.*, 2014, 43, 3525; *Chem. Sci.*, 2010, 1, 13). Regioselective C—N couplings with arylhalides are known in the art (*Chem. Sci.*, 2011, 2, 27; *J. Am. Chem. Soc.*, 2001, 123, 7727).

Primary amines (F) are converted to corresponding alkylated or (hetero)arylated amines (reductive amination or C—N coupling) (C) using commercially available aldehydes (standard reductive amination with commercially available borohydrides) or (hetero)arylhalides (standard C—N coupling reaction conditions).

Introduction of different orthogonal protecting groups PG (e.g. Boc, Cbz) to convert (A) to (D) as well as deprotection of compounds of formula (E) to (F) is well described in the literature (T. W. Green, P. G. M. Wuts, Protective Groups in Organic Synthesis, Wiley-Interscience, New York, 1999).

Reaction scheme 1.1: Compounds (A) and (E) can be synthesized according to procedures which are described in the literature.

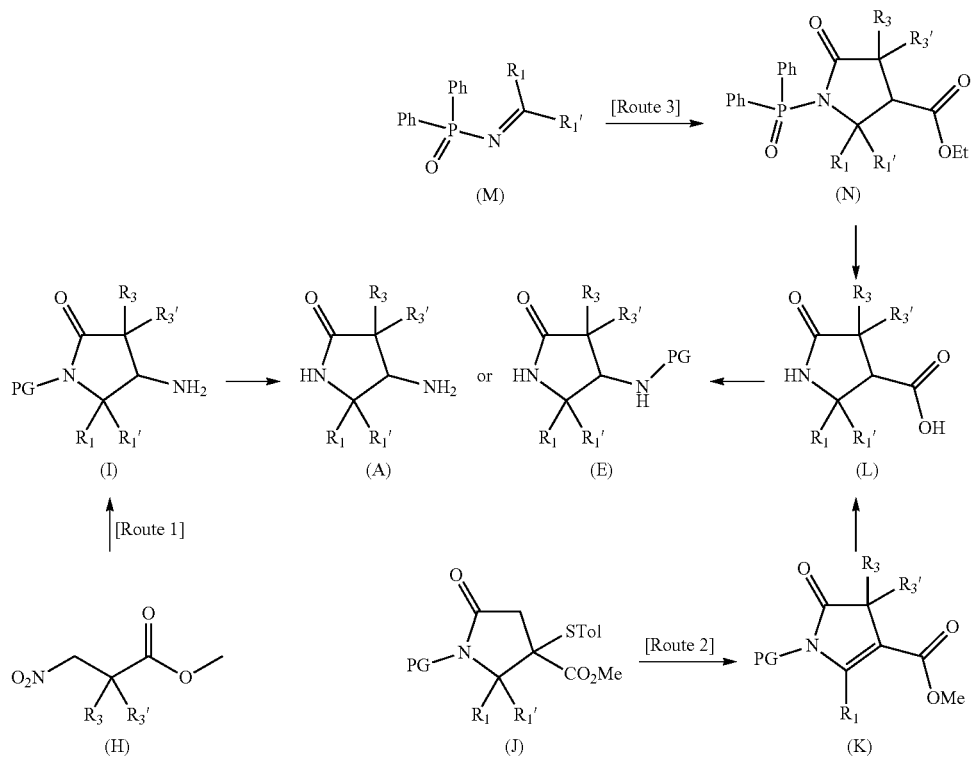

Route 1: Synthesis of compounds of formula (I) starting from compounds of formula (H) is described in the literature (*Org. Lett.*, 2011, 13, 6406, *Org. Lett*, 2009, 4512, *ACS Sustainable Chem. Eng.* 2015, 1873). For R3 and R3'=Me the synthesis of the corresponding acid of (H) is described (*Journal of Chemical and Engineering Data*, 1966, 11, 617) and the synthesis can be carried out in analogy to the references above. Removal of PG=PMB is well known in the art (*Greene's Protective Groups in Organic Synthesis*, 2007, 4th Edition, page 905ff). Reduction of nitro groups is well known in the art (*March's Advanced Organic Chemistry*, 2007, 6th Edition, page 1815f).

Route 2: Synthesis of compounds of formula (J) is described in the literature (*Org. Lett.*, 2007, 9, 4077). Introduction of substituents R3 and R3' can be achieved via alkylation. C-alkylations of pyrrolidinones (*Tetrahedron*, 1999, 55, 13321) and elimination of sulfonium salts (*Tetrahedron Letters* 1983, 24, 4331) are well known in the art. Compounds of formula (A) and (E) can be synthesized using Curtius rearrangement as key step to convert carboxylic acid (L) to corresponding primary amine (A) or (E). Curtius rearrangement is well known in the art (*Tetrahedron Letters*, 2010, 51, 385).

Route 3: Synthesis of compounds of formula (N) starting from compounds of formula (M) is described in the literature (*J Am. Chem. Soc.*, 2008, 130, 16146). Amidophosphate cleavage is described in the literature (*J Am. Chem. Soc.*, 2008, 130, 16146). Compounds of formula (A) and (E) can be synthesized using Curtius rearrangement as key step to convert carboxylic acid (L) to corresponding primary amine (A) or (E). Curtius rearrangement is well known in the art (*Tetrahedron Letters*, 2010, 51, 385).

In a preferred embodiment, the compounds according to the invention are modulators of the glucocorticoid receptor. In the sense of the invention, the term "selective modulator of the glucocorticoid receptor (glucocorticoid receptor modulator)" preferably means that the respective compound exhibits in a cellular target engagement assay for agonistic or antagonistic potency on the glucocorticoid receptor an EC50 or IC50 value on the glucocorticoid receptor of at most 15 µM ($10·10^{-6}$ mol/L) or at most 10 µM; more preferably at most 1 µM; still more preferably at most 500 nM ($10^{-9}$ mol/L); yet more preferably at most 300 nM; even more preferably at most 100 nM; most preferably at most 10 nM; and in particular at most 1 nM. In a preferred embodiment, the compound according to the invention exhibits in a cellular target engagement assay for agonistic or antagonistic potency on the glucocorticoid receptor an EC50 or IC50 value on the glucocorticoid receptor in the range of from 1 µM to 15 µM, more preferably from 100 nM to 1 µM, most preferably below 100 nM.

The person skilled in the art knows how to test compounds for modulation (agonistic or antagonistic) of the activity of the glucocorticoid receptor. Preferred target engagement assays for testing compounds for their agonistic or antagonistic potency (EC50, IC50) on the glucocorticoid receptor are described herein below:

Glucocorticoid Receptor Cell-Based Assays

Potential selective glucocorticoid receptor modulators of this intervention can be tested for modulation of the activity of the glucocorticoid receptor using cell-based assays. These assays involve a Chinese hamster ovary (CHO) cell line which contains fragments of the glucocorticoid receptor as well as fusion proteins. The glucocorticoid receptor fragments used are capable of binding the ligand (e.g. beclomethasone) to identify molecules that compete for binding with glucocorticoid receptor ligands. In more detail, the glucocorticoid receptor ligand binding domain is fused to the DNA binding domain (DBD) of the transcriptionfactor GAL4 (GAL4 DBD-GR) and is stably integrated into a CHO cell line containing a GAL4-UAS-Luciferase reporter construct. To identify selective glucocorticoid receptor modulators, the reporter cell line is incubated with the molecules using an 8-point half-log compound dilution curve for several hours. After cell lysis the luminescence that is produced by luciferase after addition of the substrate is detected and EC50 or IC50 values can be calculated. Engagement of molecules which induce gene expression via glucocortocoid receptor binding to the DNA leads to expression of the luciferase gene under the control of the fusion protein GAL4 DBD-GR and therefore to a dose-dependent increase of the luminescence signal. Binding of molecules which repress beclomethasone-induced gene expression of the luciferase gene under the control of the fusion protein GAL4 DBD-GR leads to a dose-dependent reduction of the luminescence signal.

In a preferred embodiment, the compound according to the invention exhibits in a cellular target engagement assay for agonistic or antagonistic potency on the glucocorticoid receptor an EC50 or IC50 value on the glucocorticoid receptor of at most 1 μM ($10^{-6}$ mol/L); still more preferably at most 500 nM ($10^{-9}$ mol/L); yet more preferably at most 300 nM; even more preferably at most 100 nM; most preferably at most 50 nM; and in particular at most 10 nM or at most 1 nM.

In a preferred embodiment, the compound according to the invention exhibits in a cellular target engagement assay for agonistic or antagonistic potency on the glucocorticoid receptor an EC50 or IC50 value on the glucocorticoid receptor in the range of from 1 μM to 15 μM, more preferably from 100 nM to 1 μM, most preferably below 100 nM.

In a preferred embodiment, the compound according to the invention exhibits in a cellular target engagement assay for agonistic or antagonistic potency on the glucocorticoid receptor an EC50 or IC50 value on the glucocorticoid receptor in the range of from 0.1 nM ($10^{-9}$ mol/L) to 1000 nM; still more preferably 1 nM to 800 nM; yet more preferably 1 nM to 500 nM; even more preferably 1 nM to 300 nM; most preferably 1 nM to 100 nM; and in particular 1 nM to 80 nM.

Preferably, the compounds according to the invention are useful as selective modulators of the glucocorticoid receptor.

Therefore, the compounds according to the invention are preferably useful for the in vivo treatment or prevention of diseases in which participation of the glucocorticoid receptor is implicated.

The invention therefore further relates to a compound according to the invention for use in the modulation of glucocorticoid receptor activity.

Therefore, another aspect of the invention relates to a compound according to the invention for use in the treatment and/or prophylaxis of a disorder which is mediated at least in part by the glucocorticoid receptor. Still another aspect of the invention relates to a method of treatment of a disorder which is mediated at least in part by the glucocorticoid receptor comprising the administration of a therapeutically effective amount of a compound according to the invention to a subject in need thereof, preferably a human.

A further aspect of the invention relates to the use of a compound according to the invention as medicament.

Another aspect of the invention relates to a pharmaceutical dosage form comprising a compound according to the invention. Preferably, the pharmaceutical dosage form comprises a compound according to the invention and one or more pharmaceutical excipients such as physiologically acceptable carriers, additives and/or auxiliary substances; and optionally one or more further pharmacologically active ingredient. Examples of suitable physiologically acceptable carriers, additives and/or auxiliary substances are fillers, solvents, diluents, colorings and/or binders. These substances are known to the person skilled in the art (see H. P. Fiedler, Lexikon der Hilfsstoffe fur Pharmazie, Kosmetik und angrenzende Gebiete, Edition Cantor Aulendoff).

The pharmaceutical dosage form according to the invention is preferably for systemic, topical or local administration, preferably for oral administration. Therefore, the pharmaceutical dosage form can be in form of a liquid, semisolid or solid, e.g. in the form of injection solutions, drops, juices, syrups, sprays, suspensions, tablets, patches, films, capsules, plasters, suppositories, ointments, creams, lotions, gels, emulsions, aerosols or in multiparticulate form, for example in the form of pellets or granules, if appropriate pressed into tablets, decanted in capsules or suspended in a liquid, and can also be administered as such.

The pharmaceutical dosage form according to the invention is preferably prepared with the aid of conventional means, devices, methods and processes known in the art. The amount of the compound according to the invention to be administered to the patient may vary and is e.g. dependent on the patient's weight or age and also on the type of administration, the indication and the severity of the disorder. Preferably 0.001 to 100 mg/kg, more preferably 0.05 to 75 mg/kg, most preferably 0.05 to 50 mg of a compound according to the invention are administered per kg of the patient's body weight.

The glucocorticoid receptor is believed to have potential to modify a variety of diseases or disorders in mammals such as humans. These include in particular inflammatory diseases.

Another aspect of the invention relates to a compound according to the invention for use in the treatment and/or prophylaxis of pain and/or inflammation; more preferably inflammatory pain.

A further aspect of the invention relates to a method of treatment of pain and/or inflammation; more preferably inflammatory pain.

The following examples further illustrate the invention but are not to be construed as limiting its scope.

Synthesis of trans-benzyl 4,4-dimethyl-(5-oxo-2-phenylpyrrolidin-3-yl)carbamate (intermediate A1-Cbz)

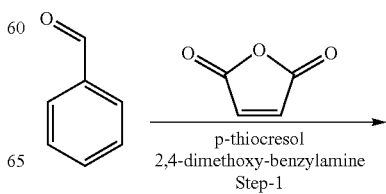

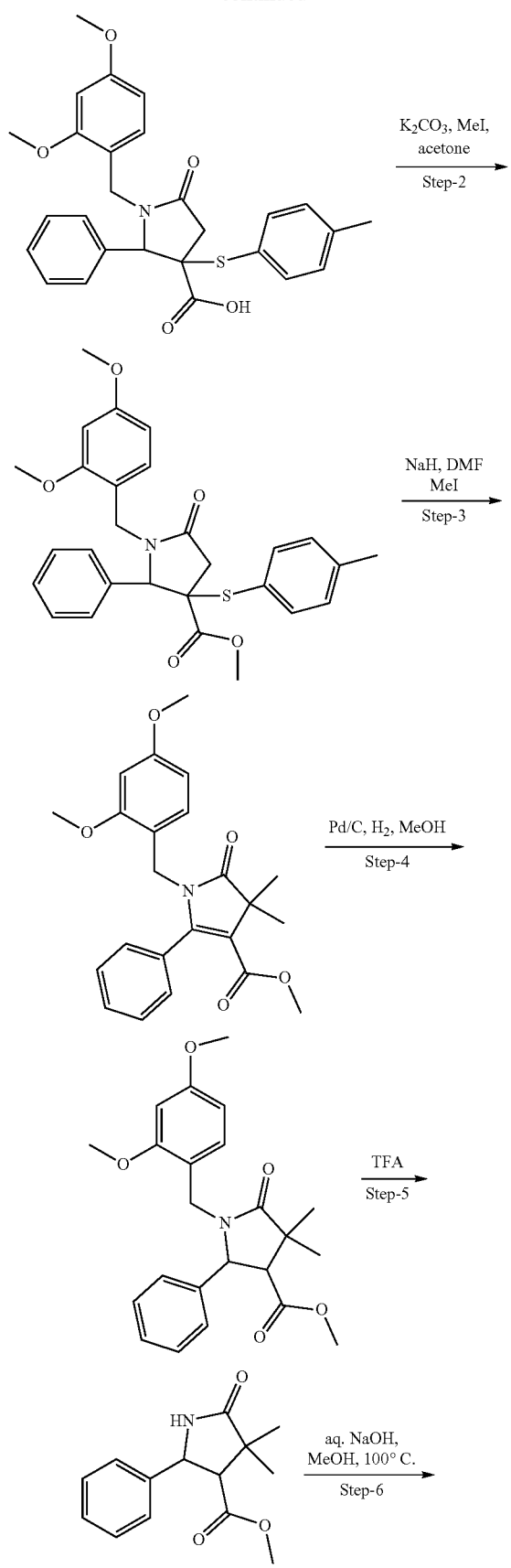

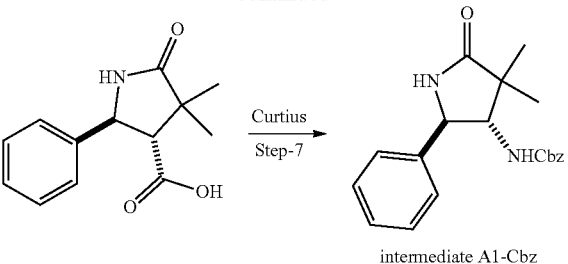

intermediate A1-Cbz

Step 1: A solution of benzaldehyde (95.18 g, 0.898 mol), 4-methylbenzenethiol (111.37 g, 0.898 mol), maleic anhydride (88.04 g, 0.898 mol) and 2,4-dimethoxybenzylamine (150.00 g, 0.898 mol) in toluene (600 ml) was stirred at ambient temperature for 2 h and was then heated to 120° C. for 16 h. After completion of the reaction (monitored by TLC, mobile phase 5% MeOH-DCM, Rf 0.4) the reaction mixture was cooled to ambient temperature and was concentrated under reduced pressure to obtain the crude product which was triturated with MTBE to afford 1-(2,4-dimethoxy-benzyl)-5-oxo-2-phenyl-3-p-tolylsulfanyl-pyrrolidine-3-carboxylic acid (150.0 g, 35%) as an off white solid.

Step 2: To a suspension of 1-(2,4-dimethoxy-benzyl)-5-oxo-2-phenyl-3-p-tolylsulfanyl-pyrrolidine-3-carboxylic acid (500.0 g, 1.05 mol) in acetone (5 L) was added $K_2CO_3$ (579.0 g, 4.19 mol) followed by methyl iodide (261.0 ml, 4.19 mol). The resulting suspension was stirred at ambient temperature for 16 h. The reaction mixture was then filtered and the filtrate was concentrated. The residue was taken up in EtOAc (1.5 L) and was washed with water. The organic layer was washed with brine, dried over sodium sulfate and was concentrated under reduced pressure to afford 1-(2,4-dimethoxy-benzyl)-5-oxo-2-phenyl-3-p-tolylsulfanyl-pyrrolidine-3-carboxylic acid methyl ester (480.0 g, 94%) as an off white solid.

Step 3: To a solution of 1-(2,4-dimethoxy-benzyl)-5-oxo-2-phenyl-3-p-tolylsulfanyl-pyrrolidine-3-carboxylic acid methyl ester (50.0 g, 0.101 mol) in DMF (0.5 L) was added sodium hydride (50% in mineral oil, 24.4 g, 0.509 mol) at 0° C. The resulting reaction mixture was stirred at 0° C. for 30 minutes. After 30 minutes, methyl iodide (31.7 ml, 0.509 mol) was added slowly. The resulting reaction mixture was then stirred for 30 min at 0° C. After completion of the reaction (monitored by TLC, mobile phase 30%-ethyl acetate-hexane, Rf 0.3) the reaction was quenched with saturated ammonium chloride solution and extracted with EtOAc (2.0 L). The combined organic layers were dried over sodium sulfate and concentrated under reduced pressure to obtain the crude compound, which was purified by column chromatography (silica gel, 100-200 mesh, 10-20% EtOAc/hexane) to afford 1-(2,4-dimethoxy-benzyl)-4,4-dimethyl-5-oxo-2-phenyl-4,5-dihydro-1H-pyrrole-3-carboxylic acid methyl ester (28.0 g, 70%) as a pale yellow solid.

Step 4: To a solution of 1-(2,4-dimethoxy-benzyl)-4,4-dimethyl-5-oxo-2-phenyl-4,5-dihydro-1H-pyrrole-3-carboxylic acid methyl ester (26.0 g, 0.117 mol) in methanol (300 ml) was added 10% palladium on charcoal (50% moisture, 13.4 g, 0.063 mol) and the resulting mixture was stirred for 16 h at ambient temperature under hydrogen pressure (balloon pressure). After completion of the reaction (monitored by TLC, mobile phase 30%-ethyl acetate-hexane, $R_f$ 0.30) the reaction mixture was filtered through a celite pad. The filtrate was concentrated under reduced pressure to obtain the crude compound which was triturated in diethyl ether to afford 1-(2,4-dimethoxy-benzyl)-4,4-dimethyl-5-oxo-2-phenyl-pyrrolidine-3-carboxylic acid methyl ester (25.0 g, 96%).

Step 5: A stirred suspension of 1-(2,4-dimethoxy-benzyl)-4,4-dimethyl-5-oxo-2-phenyl-pyrrolidine-3-carboxylic acid methyl ester (25.0 g, 0.063 mol) in TFA (250 ml) was heated to 90° C. for 16 h. After completion of the reaction (monitored by TLC, 50% ethyl ether-hexane, Rf-0.3) the reaction was cooled to ambient temperature and was concentrated under reduced pressure. The remains were basified with sat. $NaHCO_3$ solution, followed by the addition of EtOAc (1 L) and stirring of the resulting mixture for 30 minutes. The obtained solid was filtered off and dried under high vacuum to afford 4,4-dimethyl-5-oxo-2-phenyl-pyrrolidine-3-carboxylic acid methyl ester (18.0 g, crude) which was used in the next step.

Step 6: To a suspension of 4,4-dimethyl-5-oxo-2-phenyl-pyrrolidine-3-carboxylic acid methyl ester (43.0 g, 0.174 mmol) in MeOH (400 ml) was added 2M NaOH (174 ml) at 0° C. The resulting suspension was stirred at 100° C. for 4 h. After consumption of the starting material (monitored by TLC, mobile phase 5% MeOH/DCM, Rf 0.2) the reaction mixture was concentrated and the residue was diluted with water and was washed with ethyl acetate (2×75 ml). The aqueous layer was then acidified to pH 3 with 6N HCl and was extracted with 10% MeOH/DCM (2×75 ml). The combined organic layers were dried over anhydrous $Na_2SO_4$, filtered and concentrated under reduced pressure to afford trans-4,4-dimethyl-5-oxo-2-phenyl-pyrrolidine-3-carboxylic acid (22.0 g, 55.0%) as a brown solid.

Step 7: To a stirred solution of trans-4,4-dimethyl-5-oxo-2-phenyl-pyrrolidine-3-carboxylic acid (22.0 g, 0.095 mol) in benzene-THF (4:1, 125 ml) was added DPPA (25.0 ml, 0.114 mol) followed by TEA (13.35 ml, 0.095 mol) at ambient temperature and the mixture was stirred for 2 h. Benzyl alcohol (14.8 ml, 0.142 mol) was then added and the reaction mixture was heated to 90° C. for 4 h. After completion of the reaction (monitored by TLC) the reaction mixture was diluted with water (10 ml) and extracted with ethyl acetate (3×100 ml). The combined organic layers were washed with 10% citric acid solution (100 ml) followed by saturated $NaHCO_3$ solution (2×100 ml) and were then dried over anhydrous $Na_2SO_4$ and concentrated under reduced pressure. The residue was triturated with diethyl ether (2×80 ml). The obtained solid was filtered off and was dried under high vacuum to afford intermediate A1-Cbz (25.0 g, 78%) as an off white solid.

Synthesis of
trans-4-amino-5-phenylpyrrolidin-2-one
(intermediate A2)

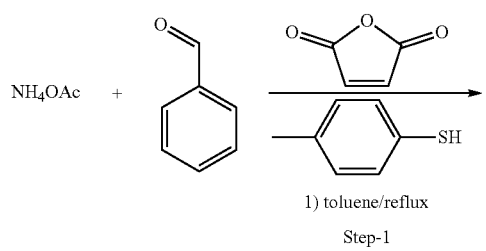

1) toluene/reflux

Step-1

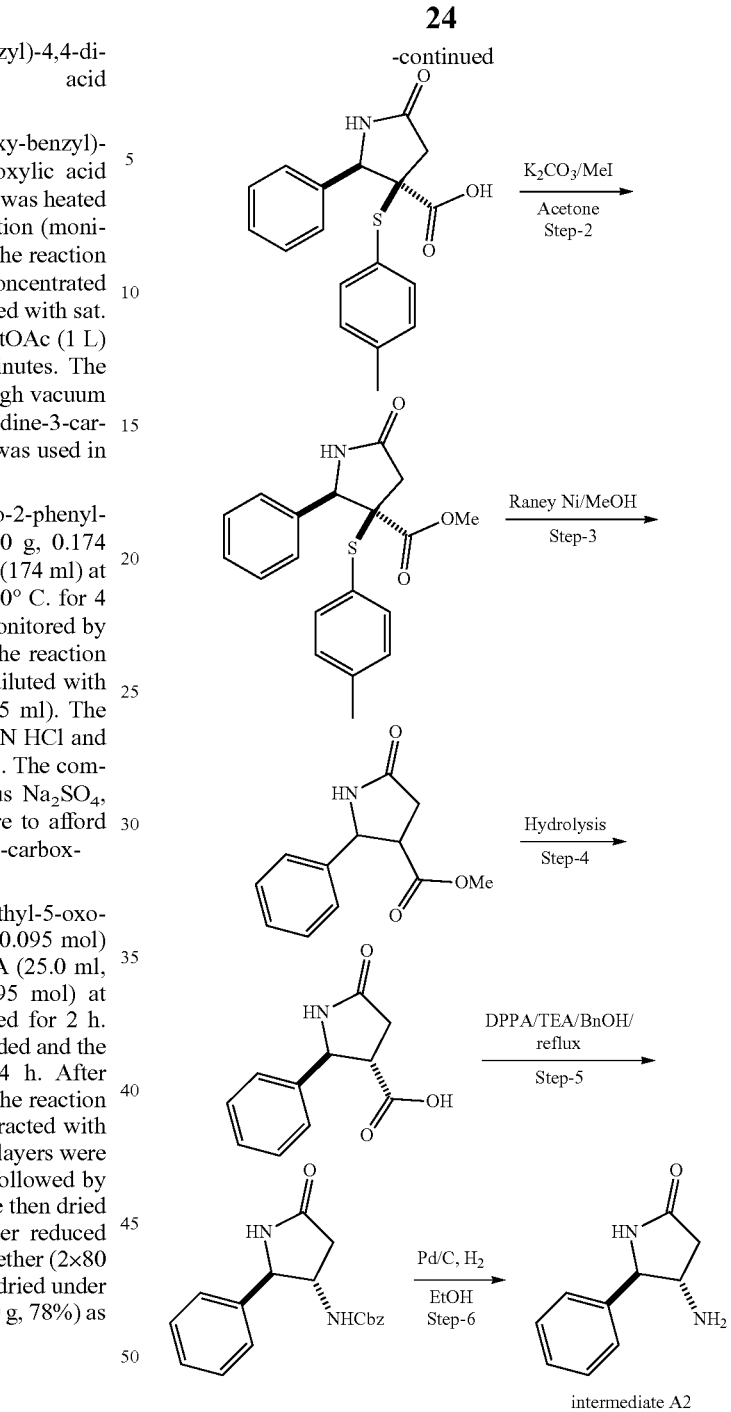

intermediate A2

Step 1: Maleic anhydride (9.8 g, 100 mmol, 1.0 eq), p-thiocresol (12.4 g, 100 mmol, 1.0 eq), ammonium acetate (7.8 g, 100 mmol, 1.0 eq) and benzaldehyde (10 mL, 100 mmol, 1.0 eq) were put in a sealed tube and 100 ml toluene was added. The reaction mixture was stirred at RT for 1 h and then stirred at 150° C. for 16 h. After cooling to RT, the solvent was evaporated under reduced pressure, and the residue was basified with sat.$NaHCO_3$ solution and was extracted with DCM. The aqueous layer was acidified with 2N HCl under ice cooling and the crude product was extracted twice with EtOAc. The combined organic layers were washed with brine, dried over $Na_2SO_4$, filtered and concentrated to get the crude 5-oxo-2-phenyl-3-(p-tolylthio) pyrrolidine-3-carboxylic acid (10.0 g, crude).

Step 2: To a stirred solution of crude 5-oxo-2-phenyl-3-(p-tolylthio)pyrrolidine-3-carboxylic acid (10.0 g, 30.58 mmol, 1.0 eq) in acetone (100 mL), potassium carbonate (16.8 g, 122.32 mmol, 4.0 eq) and methyl iodide (7.6 ml, 122.32 mmol, 4.0 eq) were added at 0° C., and the reaction was stirred for 16 h at RT. The solvent was removed under reduced pressure, and the residue was partitioned between DCM and water. The aqueous layer was extracted twice with DCM. The combined organic layers were washed with brine, dried over Na2SO4, filtered, and concentrated. The crude product was purified by column chromatography (100-200 silica gel, 50% EtOAc:hexanes) to give methyl 5-oxo-2-phenyl-3-(p-tolylthio)pyrrolidine-3-carboxylate (4.0 g, 38%) as an off-white solid.

Step 3: To a stirred solution of methyl 5-oxo-2-phenyl-3-(p-tolylthio)pyrrolidine-3-carboxylate (4.0 g, 11.73 mmol, 1.0 eq) in EtOH:THF (100 mL, 2:1), Raney Nickel (1 g) was added and the reaction mixture was stirred for 2 h at RT After completion, the reaction mixture was filtered through a celite bed and the celite bed was washed 2-3 times with EtOAc. The combined organic layers were concentrated and the crude was purified by column chromatography (100-200 silica gel, 50% EtOAc:hexanes) to afford methyl 5-oxo-2-phenylpyrrolidine-3-carboxylate (2.2 g, 88%, syn: anti, 1:1 mixture) as an off-white solid.

Step 4: To a stirred solution of methyl 5-oxo-2-phenylpyrrolidine-3-carboxylate (1.0 g, 4.56 mmol, 1.0 eq) in MeOH (25 mL) was added 2 N NaOH solution (5 mL) and the reaction mixture was stirred at 80° C. for 2 h. After completion of the reaction (monitored by LCMS), the reaction mixture was concentrated and acidified with 2N HCl solution and was extracted with 30% isopropanol-DCM. The combined organic layers were dried over Na2SO4 and were concentrated under reduced pressure to get the desired trans-5-oxo-2-phenylpyrrolidine-3-carboxylic acid (0.8 g, 85%).

Step 5: To a stirred solution of trans-5-oxo-2-phenylpyrrolidine-3-carboxylic acid (0.5 g, 2.43 mmol, 1.0 eq) in benzene:THF (25 mL, 4:1) was added TEA (0.68 ml, 4.87 mmol, 2.0 eq) and DPPA (0.68 ml, 3.17 mmol, 1.3 eq) and the reaction mixture was stirred at RT for 2 h. Then benzyl alcohol (0.33 mL, 3.17 mmol, 1.3 eq) was added and the reaction mixture was heated to reflux for 16 h. After completion, the reaction mixture was concentrated under reduced pressure to get the crude compound which was extracted with water and EtOAc. The combined organic layers were dried over Na2SO4 and concentrated under reduced pressure to get the crude product which was purified by column chromatography (100-200 mesh silica gel; 2% MeOH-DCM; Rf-value-0.5) to afford trans-benzyl (5-oxo-2-phenylpyrrolidin-3-yl)carbamate (0.38 g, 50%).

Step 6: To a stirred solution of trans-benzyl (5-oxo-2-phenylpyrrolidin-3-yl)carbamate (1.7 g, 5.48 mmol, 1.0 eq) in MeOH (20 mL, 2:1), Pd/C (0.058 g, 0.548 mmol, 0.1 eq) was added, and the reaction was stirred with a hydrogen balloon for 2 h at RT. After completion, the reaction mixture was filtered through a celite bed and the celite bed was washed 2-3 times with EtOAc. The combined organic layers were concentrated to get the desired trans-4-amino-5-phenylpyrrolidin-2-one as brown gum (0.9 g, 93%).

Synthesis of intermediate A3-Cbz (benzyl (rac-(2R, 3S,4S)-4-methyl-5-oxo-2-phenylpyrrolidin-3-yl) carbamate)

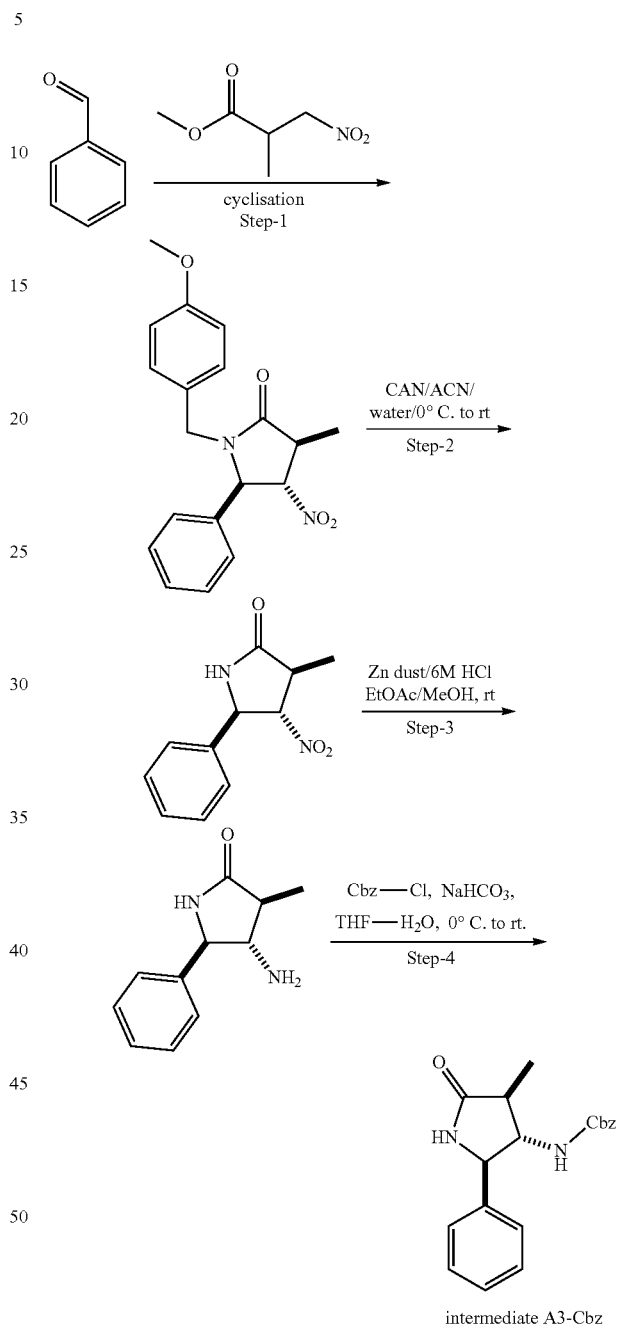

intermediate A3-Cbz

Step 1: Synthesis of rac-(3S,4S,5R)-1-(4-methoxybenzyl)-3-methyl-4-nitro-5-phenylpyrrolidin-2-one: To a stirred solution of benzaldehyde (10.82 g, 102.04 mmol) in toluene (100 ml) was added 4-methoxy benzylamine (13.99 g, 102.04 mmol) at rt and stirred for 2 h at rt. To this reaction mixture was added methyl 2-methyl-3-nitropropanoate (10 g, 68.03 mmol) followed by benzoic acid (12.46 g, 102.04 mmol) and stirring was continued for 16 h at 70° C. After completion of reaction (monitored by LCMS), the reaction mixture was diluted with ethyl acetate (400 ml) and washed with water (100 ml×2), followed by sat.NaHCO3 (100 ml×2). The organic layer was dried over anhydrous Na₂SO₄ and concentrated. The crude product was purified through column chromatography (using silica gel 100-200 mesh; 25-30% ethyl acetate in hexane as eluent) to afford rac-(3S, 4S,5R)-1-(4-methoxybenzyl)-3-methyl-4-nitro-5-phenylpyrrolidin-2-one (10 g, 43%) as brownish solid.

Step 2: Synthesis of rac-(3S,4S,5R)-3-methyl-4-nitro-5-phenylpyrrolidin-2-one. To a stirred solution of rac-(3S,4S, 5R)-1-(4-methoxybenzyl)-3-methyl-4-nitro-5-phenylpyrrolidin-2-one (10 g, 29.41 mmol) in acetonitrile (100 ml) was added a solution of CAN (48.37 g, 88.24 mmol) in water (100 ml) dropwise at 0° C. The reaction mixture was slowly warmed to 15° C. and stirring was continued for 3-4 h. After completion (monitored by TLC, 50% ethyl acetate/hexane, $R_f$ 0.2), the reaction mixture was diluted with ethyl acetate (500 ml) and washed with water (100 ml×2) followed by brine (250 ml). The organic layer was dried over Na₂SO₄ and concentrated. The crude material was purified by column chromatography (using silica gel 100-200 mesh; 40-50% ethyl acetate in hexane as eluent) to afford of rac-(3S,4S,5R)-3-methyl-4-nitro-5-phenylpyrrolidin-2-one (4.00 g, 62%) as light yellow solid.

Step 3: Synthesis of rac-(3S,4S,5R)-4-amino-3-methyl-5-phenylpyrrolidin-2-one: To a stirred solution of of rac-(3S, 4S,5R)-3-methyl-4-nitro-5-phenylpyrrolidin-2-one (4.5 g, 20.45 mmol) in EtOAc-MeOH (2:1, 450 ml) was added 6 M aq. HCl (102.2 ml) at 0° C. To this reaction mixture was added Zn dust (80.25 g, 1.227 mol) portionwise at the same temperature. The resulting suspension was stirred at room temperature for 16 h. After completion of reaction (monitored by LCMS), the reaction mixture was quenched with saturated NaHCO₃ solution at 0° C., stirred for 1 h, filtered over celite and washed with EtOAc-MeOH (500 ml, 2:1). The filtrate was concentrated to afford rac-(3S,4S,5R)-4-amino-3-methyl-5-phenylpyrrolidin-2-one (3.9 g crude, considered as 100% yield) which was used without further purification.

Step 4: To a stirred suspension of rac-(3S,4S,5R)-4-amino-3-methyl-5-phenylpyrrolidin-2-one (3.9 g crude, 20.45 mmol) in THF:Water (1:1, 225 ml) was added sodium bicarbonate (9.95 g, 118.42 mmol) at 0° C. and stirred for 30 minutes. Benzyl chloroformate (11.8 ml, 35.53 mmol, 50% in toluene) was added to the reaction mixture at 0° C. and stirring was continued for 16 h at rt. After completion (monitored by LCMS), the reaction mixture was diluted with water (300 ml) and extracted with ethyl acetate (3×500 ml). The combined organics were washed with water (200 ml×2) followed by brine (200 ml) and dried over Na₂SO₄. After removal of the solvent, the crude material was purified by column chromatography (using silica gel 100-200 mesh; 2-2.5% MeOH in DCM as eluent) to afford intermediate A3-Cbz benzyl (rac-(2R,3S,4S)-4-methyl-5-oxo-2-phenylpyrrolidin-3-yl)carbamate (3.5 g, 53% in two steps).

Synthesis of (4S,5R)-4-amino-1-(1-(4-fluorophenyl)-1H-indazol-5-yl)-3,3-dimethyl-5-phenylpyrrolidin-2-one (intermediate C₁-ent1) and (4R,5S)-4-amino-1-(1-(4-fluorophenyl)-1H-indazol-5-yl)-3,3-dimethyl-5-phenylpyrrolidin-2-one (intermediate C₁-ent2)

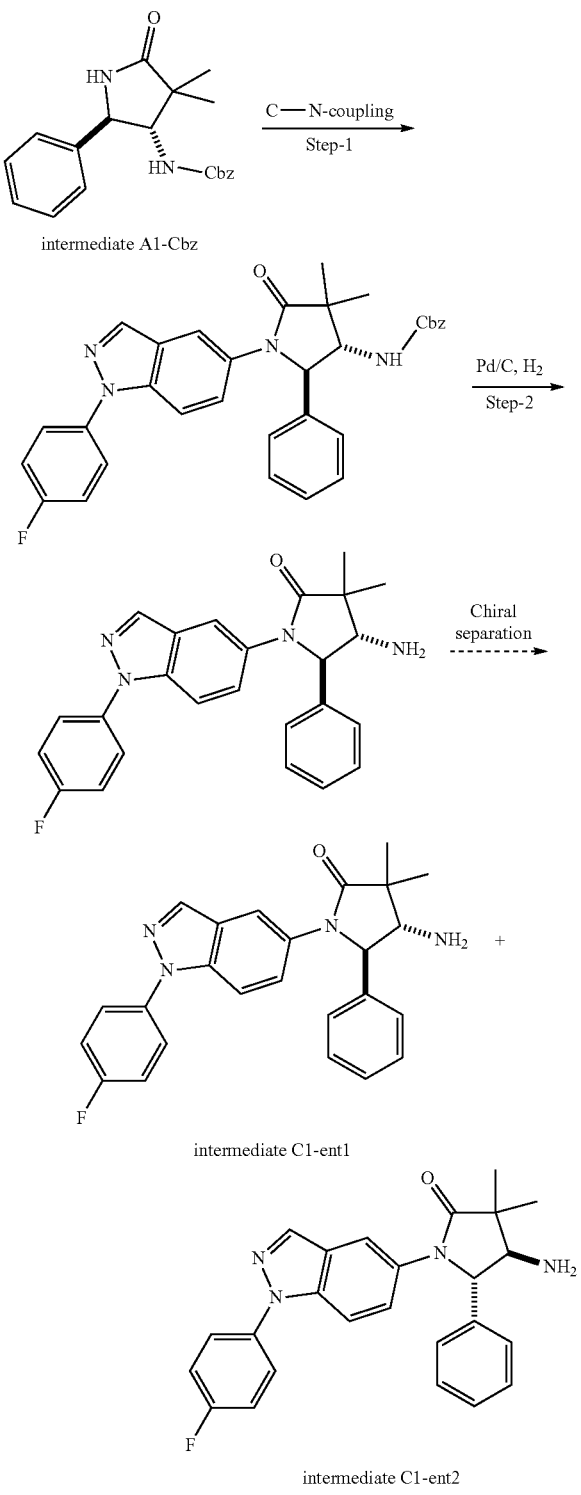

Step 1: To a stirred solution of benzyl (trans-4,4-dimethyl-5-oxo-2-phenylpyrrolidin-3-yl)carbamate (2.0 g, 5.91 mmol) in 1,4-dioxane (100 mL) in a sealed tube was added 1-(4-Fluoro-phenyl)-5-iodo-1H-indazole (2.4 g, 7.10 mmol) followed by potassium phosphate (2.51 g, 11.83 mmol) and the mixture was degassed using argon for 30 minutes. Then, trans-N,N'-dimethyl cyclohexane-1,2-diamine (0.4 ml, 2.37 mmol) and copper(I)iodide (225 mg, 1.18 mmol) were added and the mixture was heated to 100-110° C. for 16 h. After completion of the reaction (monitored by LCMS, 5% MeOH in DCM), the reaction mixture was filtered through a celite bed and the celite bed was washed with 1,4-dioxane (100 mL), the filtrate was then concentrated under reduced pressure. The reaction was carried out in 10 batches in parallel (2 g each). The combined crude material was purified by column chromatography (silica gel, 100-200 mesh, 2-2.5% MeOH/DCM) to afford benzyl (trans-1-(1-(4-fluorophenyl)-1H-indazol-5-yl)-4,4-dimethyl-5-oxo-2-phenylpyrrolidin-3-yl)carbamate (14.5 g, 45%) as a pale yellow solid.

Step 2: To a stirred solution of benzyl (trans-1-(1-(4-fluorophenyl)-1H-indazol-5-yl)-4,4-dimethyl-5-oxo-2-phenylpyrrolidin-3-yl)carbamate (4.0 g, 7.68 mmol) in THF/MeOH (500 mL, 1:1) was added 10% Pd/C (50% moist, 2.0 g) and the resulting mixture was stirred at ambient temperature under $H_2$ balloon pressure until completion of the reaction (monitored by TLC, 5% MeOH in DCM). The reaction mixture was then filtered through celite and the celite bed was washed with THF. The filtrate was then concentrated under reduced pressure. The reaction was carried out in four batches in parallel (4 g each) and the combined crude material was purified by column chromatography (silica gel, 100-200 mesh, 1.5-2.% MeOH/DCM as eluent) to afford trans-4-amino-1-(1-(4-fluorophenyl)-1H-indazol-5-yl)-3,3-dimethyl-5-phenylpyrrolidin-2-one (7.1 g, 56%) as an off-white solid.

Chiral separation (Chiralpak IC (21.0×250 mm), 5 µm, mobile phase n-hexane/EtOAc/EtOH/isopropylamine 70/15/15/0.1, flow rate 21.0 mL/min) of the racemic compound (7.1 g) in normal phase afforded (intermediate $C_1$-ent1, retention time 6.10 minutes) and (intermediate $C_1$-ent2, retention time 7.30 minutes).

Synthesis of (trans)-4-Amino-1-[1-(4-fluoro-phenyl)-1H-indazol-5-yl]-5-phenyl-pyrrolidine-2-one (Intermediate $C_2$)

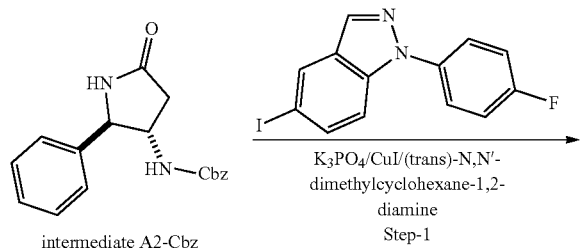

intermediate A2-Cbz $K_3PO_4$/CuI/(trans)-N,N'-dimethylcyclohexane-1,2-diamine

Step-1

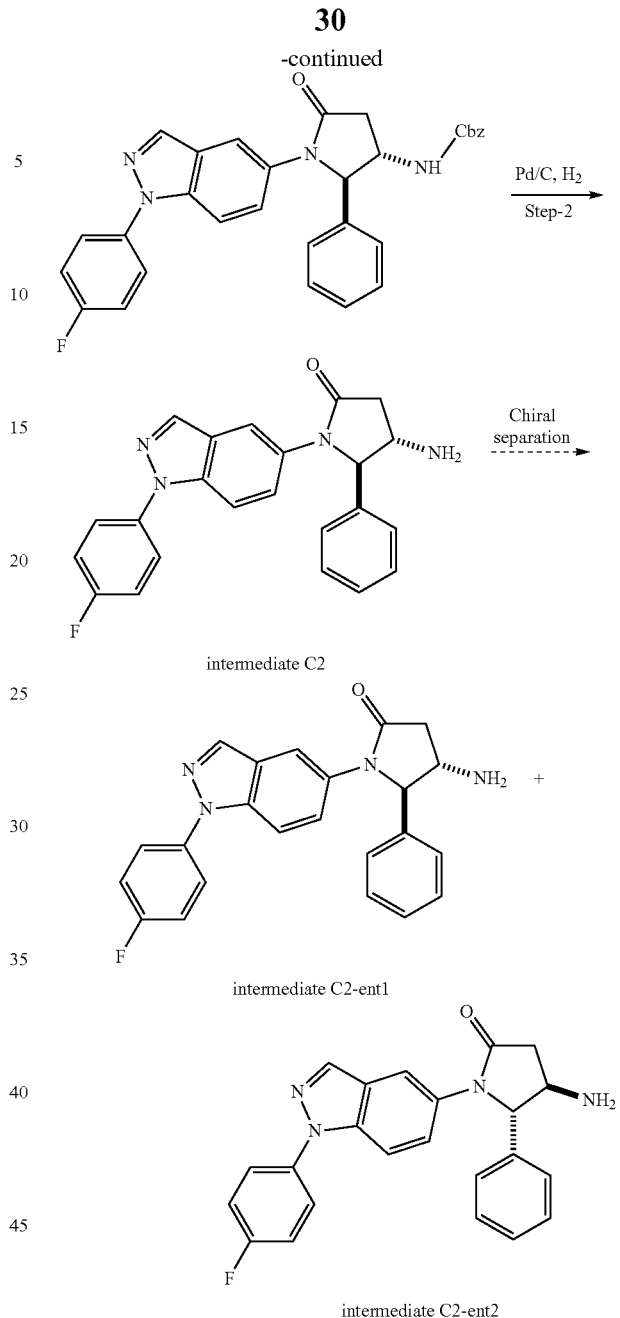

intermediate C2 intermediate C2-ent1 intermediate C2-ent2

Step 1: To a stirred solution of benzyl N-[(trans)-2-phenyl-5-oxo-pyrrolidin-3-yl]carbamate (intermediate A2-Cbz)(1.0 g, 3.22 mmol, 1.0 eq) and 1-(4-fluoro-phenyl)-5-iodo-1H-indazole (1.1 g, 3.22 mmol, 1.0 eq) in 1,4-dioxane (80 mL) in a sealed tube was added potassium phosphate (1.4 g, 6.44 mmol, 2.0 eq) followed by trans-N,N'-dimethylcyclohexane-1,2-diamine (1.02 ml, 0.644 mmol, 0.2 eq). The reaction mixture was degassed under an argon atmosphere for 30 minutes. CuI (61.3 mg, 0.322 mmol, 0.1 eq) was added and the reaction was heated to 90° C. for 16 hours (monitored by LCMS). The reaction mixture was filtered through a bed of celite and the celite bed was washed with ethyl acetate (500 mL), the combined filtrate was concentrated under reduced pressure and was purified by column chromatography (100-200 silica gel, 30-40% ethyl acetate-hexane as eluent) to afford trans {1-[1-(4-Fluoro-phenyl)-1H-indazol-5-yl]-5-oxo-2-phenyl-pyrrolidin-3-yl}-carbamic acid benzyl ester (0.70 g, 42%)

Step 2: To a stirred solution of trans {1-[1-(4-Fluorophenyl)-1H-indazol-5-yl]-5-oxo-2-phenyl-pyrrolidin-3-yl}-carbamic acid benzyl ester (18.0 g, 34.58 mmol) in THF (800 mL) was added 10% Pd/C (50% moist, 40 g) and the reaction mixture was then stirred under a $H_2$ balloon until completion (monitored by TLC). The reaction mixture was filtered through a celite bed and the celite bed was washed with THF. The filtrate was concentrated and triturated with DCM-pentane to afford trans 4-amino-1-[1-(4-fluoro-phenyl)-1H-indazol-5-yl]-5-phenyl-pyrrolidine-2-one as an off-grey solid (10.8 g, 81%).

The racemic intermediate $C_2$ can be separated by chiral HPLC using the following conditions: column: CHIRAL-PAK AD-H (4.6×2500) mm, mobile Phase: MeOH (100%), temperature: 40° C.

Using those conditions, intermediate $C_2$-ent1 (retention time: 6.15 minutes) and intermediate $C_2$-ent2 (retention time: 9.31 minutes) can be obtained.

Synthesis of intermediate $C_3$ rac-(3S,4S,5R)-4-amino-1-(1-(4-fluorophenyl)-1H-indazol-5-yl)-3-methyl-5-phenylpyrrolidin-2-one

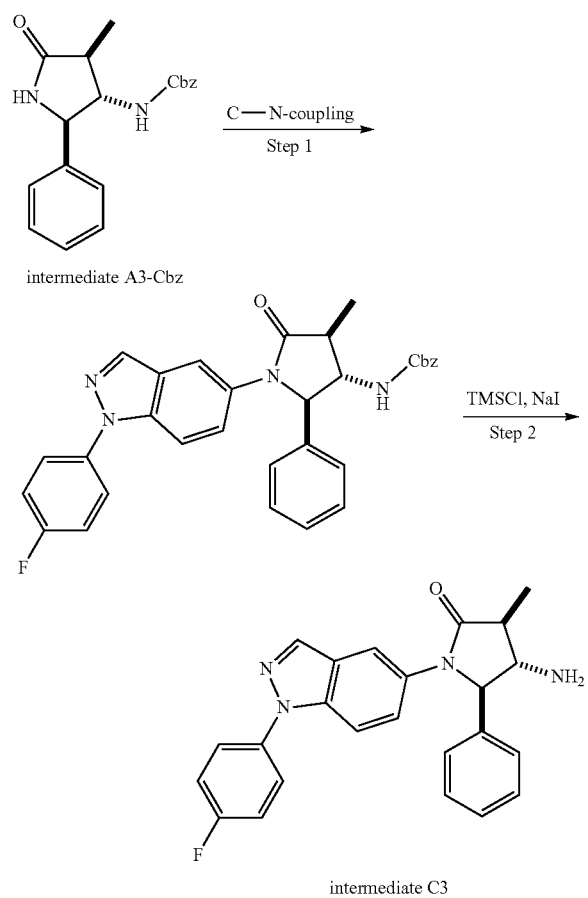

intermediate A3-Cbz intermediate C3

Step 1: Synthesis of benzyl N-[rac-(2R,3S,4S)-1-[1-(4-fluorophenyl)indazol-5-yl]-4-methyl-5-oxo-2-phenyl-pyrrolidin-3-yl]carbamate. In a microwave vial, benzyl N-[rac(2R,3S,4S)-4-methyl-5-oxo-2-phenyl-pyrrolidin-3-yl] carbamate (500 mg, 1.54 mmol) was added to 1-(4-fluorophenyl)-5-iodo-indazole (537 mg, 1.70 mmol), $K_3PO_4$ (654 mg, 3.08 mmol) and CuI (58.7 mg, 0.308 mmol). The vial was sealed and purged with nitrogen. To the mixture, 1,4-dioxane (15.4 mL), followed by (1R,2R)—N,N'-Dimethyl-1,2-cyclohexandiamine (87.7 mg, 0.617 mmol) were added subsequently. The mixture was heated to 100° C. overnight and to 110° C. for 5 h afterwards. After reaction control (UPLC) showed full conversion of the starting material, the slurry was allowed to cool down to room temperature and ethyl acetate followed by sat. $NaHCO_3$-solution were added. The mixture was stirred for 5 minutes, the layers were separated and the aqueous layer was extracted with ethyl acetate once. The combined organic layers were washed with brine and dried over $MgSO_4$. Flash chromatography (40 g silica-cartridge, cyclohexane/ethyl acetate gradient as eluent) of the crude material gave N-[rac-(2R,3S,4S)-1-[1-(4-fluorophenyl)indazol-5-yl]-4-methyl-5-oxo-2-phenyl-pyrrolidin-3-yl]carbamate (465 mg, 0.870 mmol, 56%) as a white solid.

Step 2: A solution of N-[rac-(2R,3S,4S)-1-[1-(4-fluorophenyl)indazol-5-yl]-4-methyl-5-oxo-2-phenyl-pyrrolidin-3-yl]carbamate (465 mg, 0.870 mmol) in acetonitrile (23 ml) was added to NaI (783 mg, 5.22 mmol) in a sealed tube. To this mixture, trimethylsilyl chloride (0.442 mL, 3.48 mmol) was added dropwise. The reaction mixture was stirred at room temperature overnight and was slowly added to ethanol (28 ml) after reaction control showed completion (UPLC). The resulting solution was charged on a 5 g SCX cartridge, washed two times with ethanol (15 ml each) and eluated with 2M ammonia in methanol. The methanolic fractions were combined. Evaporation of the solvent gave (rac-3S,4S,5R)-4-amino-1-[1-(4-fluorophenyl)indazol-5-yl]-3-methyl-5-phenyl-pyrrolidin-2-one intermediate $C_3$ (316 mg, 0.789 mmol, 91%) as a white solid.

EXAMPLE 1: (4S,5R)-4-((CYCLOPROPYLMETHYL)AMINO)-1-(1-(4-FLUOROPHENYL)-1H-INDAZOL-5-YL)-3,3-DIMETHYL-5-PHENYLPYRROLIDIN-2-ONE

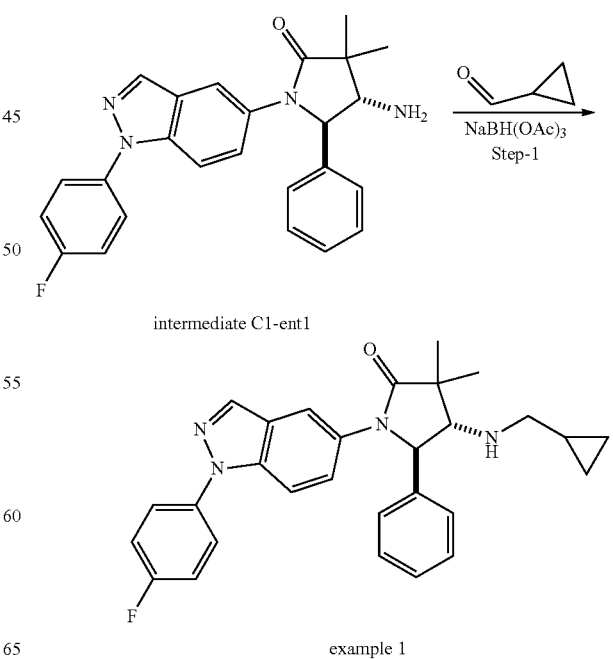

intermediate C1-ent1 example 1

Step-1: In a dried vessel, intermediate $C_1$-ent 1 (50 mg, 0.12 mmol) was dissolved in dry DCM (1.1 ml) together with $NaBH(OAc)_3$ (76.7 mg, 0.36 mmol, 3.0 eq.) and cyclopropanecarboxaldehyde (21.1 mg, 0.362 mmol, 3.0 eq.) under inert atmosphere. To the mixture was added acetic acid (7 μL, 0.12 mmol, 1.0 eq.) and the reaction was stirred overnight at rt until the starting material was consumed (LCMS). Saturated $NaHCO_3$-solution (1 mL) was added and stirring was continued for 30 min. After dilution with DCM (10 mL), the layers were separated by means of a hydrophobic frit. The solvent was evaporated and the crude product was purified by flash chromatography (silica, cyclohexane/ethyl acetate gradient) to obtain example 1 ((4S,5R)-4-((cyclopropylmethyl)amino)-1-(1-(4-fluorophenyl)-1H-indazol-5-yl)-3,3-dimethyl-5-phenylpyrrolidin-2-one, 42.0 mg, 0.090 mmol, 74%).

$^1$H NMR (DMSO-$d_6$) δ: 8.26 (s, 1H), 7.75-7.69 (m, 3H), 7.63 (dd, 1H), 7.42 (dd, 1H), 7.38 (ddd, 4H), 7.22 (t, 2H), 7.14 (t, 1H), 5.02 (d, 1H), 3.07 (t, 1H), 2.22 (s, 2H), 1.29 (s, 3H), 1.14 (s, 3H), 0.72-0.62 (m, 1H), 0.27 (dq, 2H), −0.02--0.09 (m, 1H), −0.09--0.15 (m, 1H).

EXAMPLE 2: (4S,5R)-4-((CYCLOPROPYLMETHYL)AMINO)-1-(1-(4-FLUOROPHENYL)-1H-INDAZOL-5-YL)-5-PHENYLPYRROLIDIN-2-ONE AND EXAMPLE 3 (4S,5R)-4-(BIS(CYCLOPROPYLMETHYL)AMINO)-1-(1-(4-FLUOROPHENYL)-1H-INDAZOL-5-YL)-5-PHENYLPYRROLIDIN-2-ONE

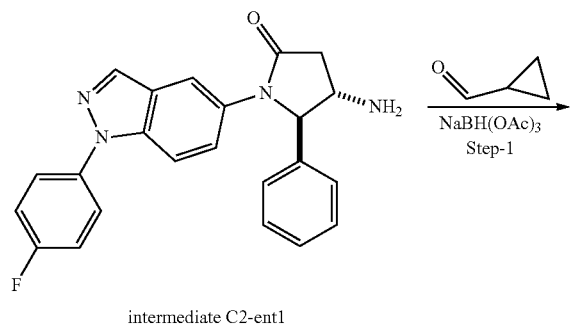

intermediate C2-ent1

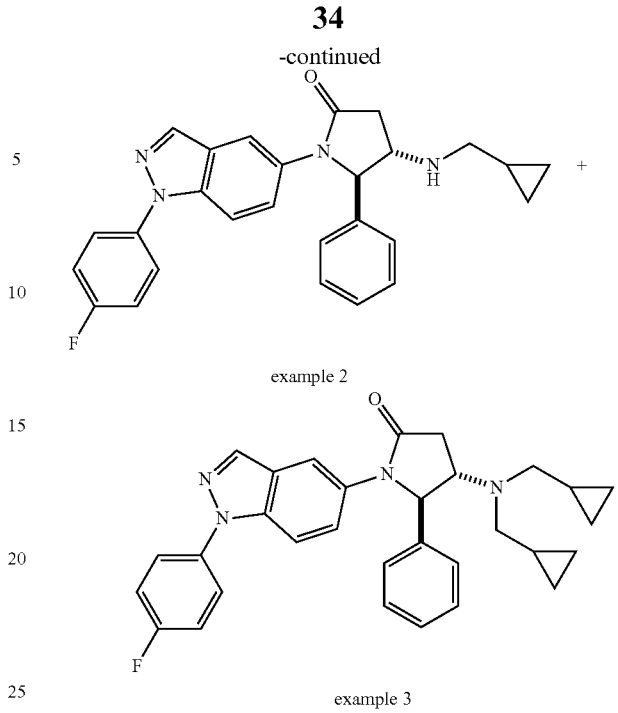

example 2 example 3

Step 1: In analogy to the procedure described for example 1, intermediate $C_2$-ent1 was reacted with cyclopropylcarbaldehyde to obtain example 2 (4S,5R)-4-((cyclopropylmethyl)amino)-1-(1-(4-fluorophenyl)-1H-indazol-5-yl)-5-phenylpyrrolidin-2-one, yield 22% and example 3 (4S,5R)-4-(bis(cyclopropylmethyl)amino)-1-(1-(4-fluorophenyl)-1H-indazol-5-yl)-5-phenylpyrrolidin-2-one, yield 34%.

Example 2, $^1$H NMR (DMSO-$d_6$) δ: 8.29 (s, 1H), 7.89 (d, 1H), 7.78-7.72 (m, 2H), 7.72-7.63 (m, 2H), 7.39 (t, 2H), 7.35-7.28 (m, 4H), 7.21 (tt, 1H), 5.23 (d, 1H), 3.23 (dt, 1H), 2.95 (dd, 1H), 2.59 (dd, 1H), 2.44 (dd, 1H), 2.38 (dd, 1H), 0.91-0.84 (m, 1H), 0.43-0.38 (m, 2H), 0.21-0.06 (m, 2H)

Example 3: $^1$H NMR (DMSO-$d_6$) δ: 8.28 (d, 1H), 7.87 (dd, 1H), 7.77-7.69 (m, 2H), 7.67 (dt, 1H), 7.60 (dd, 1H), 7.43-7.35 (m, 2H), 7.35-7.31 (m, 2H), 7.31-7.25 (m, 2H), 7.21-7.15 (m, 1H), 5.32 (d, 1H), 3.76 (ddd, 1H1), 2.97 (dd, 1H1), 2.60-2.52 (m, 5H), 0.85-0.76 (m, 2H), 0.40 (tddd, 4H), 0.16-0.02 (m, 4H)

The examples in the following table were synthesized in analogy to example 1 described above, using different intermediates.

| Ex. # | Intermediate (INT) | Structure | Yield (%) | $^1$H NMR |
|---|---|---|---|---|
| 4 | C3 | | 13 | $^1$H NMR (DMSO-$d_6$) δ: 8.27 (d, 1H), 7.78 (d, 1H), 7.77-7.70(m, 2H), 7.65 (d, 1H), 7.51 (dd, 1H), 7.43-7.31 (m, 4H), 7.24 (t, 2H), 7.14 (t, 1H), 5.11 (d, 1H), 3.32 (s, 0H), 2.98 (dd, 1H), 2.59-2.54 (m, 1H), 2.42 (dd, 1H), 2.35 (d, 0H), 1.30 (d, 3H), 0.82-0.74 (m, 1H), 0.34 (dq, 2H), 0.09-0.03 (m, 2H) |

-continued
| Ex. # | Intermediate (INT) | Structure | Yield (%) | ¹H NMR |
|---|---|---|---|---|
| 5 | C1-ent1 | 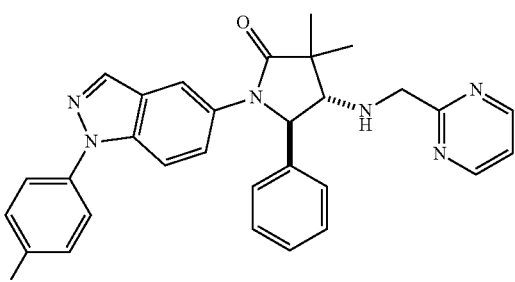 | 11 | ¹H NMR (DMSO-d₆) δ: 8.69 (s, 1H), 8.68 (s, 1H), 8.25 (s, 1H), 7.75 7.68 (m, 3H), 7.62 (d, 1H), 7.44 (dd, 1H), 7.41 7.31 (m, 5H), 7.20 (t, 2H), 7.12 (t, 1H), 5.14 (d, 1H), 3.81 3.70 (m, 2H), 3.24 3.18 (m, 1H), 2.07 (s, 0H), 1.30 (s, 3H), 1.20 (s, 3H) |
| 6 | C2-ent1 | 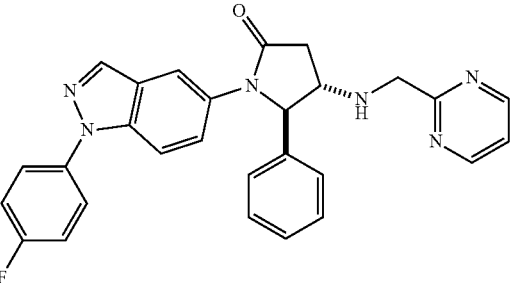 [SMILES: O=C1C[C@H](NCc2ncccn2)[C@@H](c2ccccc2)N1c1ccc2c(cnn2-c2ccc(F)cc2)c1] | 12 | ¹H NMR (DMSO-d₆) δ: 8.78 (d, 2H), 8.30 (s, 1H), 7.92 (d, IH), 7.78-7.72 (m, 2H), 7.70 (s, 2H), 7.43-7.36 (m, 3H), 7.39-7.32 (m, 1H), 7.31 (dd, 4H), 7.21 (t, 1H), 5.41 (d, 1H), 4.09 (s, 2H), 3.37-3.33 (m, 1H), 2.94 (dd, 1H), 2.46 (dd, 1H) |
| 7 | C3 | 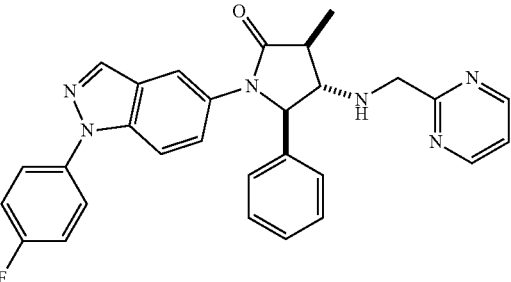 | 19 | ¹H NMR (DMSO-d₆) δ: 8.74 (d, 2H), 8.27 (d, 1H), 7.80 (dd, 1H), 7.77-7.70 (m, 2H), 7.65 (dd, 1H), 7.53 (dd, 1H), 7.43-7.36 (m, 3H), 7.36-7.31 (m, 2H), 7.23 (dd, 2H), 7.18-7.11 (m, 1H), 5.26 (d, 1H), 3.97 (d, 1H). 3.88 (d, 1H), 3.36 (s, 1H), 3.12 (t, 1H), 2.69 (p, 1H), 1.28 (d, 3H) |
| 8 | C1-ent1 | 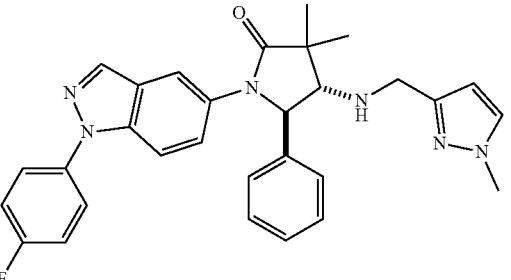 | 29 | ¹H NMR (DMSO-d₆) δ: 8.25 (s, 1H), 7.75-7.68 (m, 3H), 7.62 (d, 1H), 7.47 - 7.41 (m, 2H), 7.40-7.35 (m, 5H), 7.22 (t, 2H), 7.14 (t, 1H), 5.86 (d, 1H), 5.06 (d, 1H), 3.71 (d, 3H), 3.53-3.43 (m, 1H), 3.10 (t, 1H), 2.23 (q, 1H), 1.25 (s, 3H), 1.17 (s, 3H). |
| 9 | C1-ent1 | 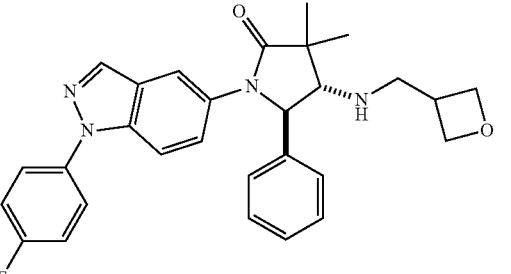 | 26 | ¹H NMR (DMSO-d₆) δ: 8.25 (d, 1H), 7.75-7.67 (m, 3H), 7.63 (d, 1H), 7.42 (dd, 1H), 7.40-7.35 (m, 4H), 7.23 (t, 2H), 7.15 (t, IH), 4.96 (d, 1H), 4.47 (dd, 1H), 4.40 (dd, 1H), 4.05 (q, 2H), 2.97 (t, 1H), 2.82-2.73 (m, 1H), 2.62 (ddt, 2H), 1.27 (s, 3H), 1.12 (s, 3H). |

| Ex. # | Intermediate (INT) | Structure | Yield (%) | 1H NMR |
|---|---|---|---|---|
| 10 | C1-ent1 | | 19 | 1H NMR (DMSO-d6) δ: 8.25 (d, 1H), 7.75-7.67 (m, 3H), 7.65-7.60 (m, 1H), 7.44-7.33 (m, 5H), 7.22 (dd, 2H), 7.17 - 7.10 (m, 1H), 4.97 (d, 1H), 3.73 (dddd, 2H), 3.13 (dtd, 2H), 2.99 (d, 1H), 2.24 (qd, 2H), 1.49-1.41 (m, 1H), 1.39-1.30 (m, 2H), 1.29 (s, 3H), 1.13 (s, 3H), 1.02-0.88 (m, 2H). |
| 11 | C3 | | | 1H NMR (DMSO-d6) δ: 8.27 (d, 1H), 7.79 (d, 1H), 7.77-7.70 (m, 2H), 7.66 (d, 1H), 7.52 (dd, 1H), 7.43 -7.32 (m, 4H), 7.25 (q, 4H), 7.21-7.14 (m, 4H), 5.21 (d, 1H), 3.77 (d, 1H), 3.69 -3.63 (m, 1H), 2.95 (d, 1H), 2.64 (q, 1H), 1.27 (d, 3H). |

EXAMPLE 12: (4S,5R)-1-(1-(4-FLUOROPHENYL)-1H-INDAZOL-5-YL)-5-PHENYL-4-(THIAZOL-2-YLAMINO)PYRROLIDIN-2-ONE

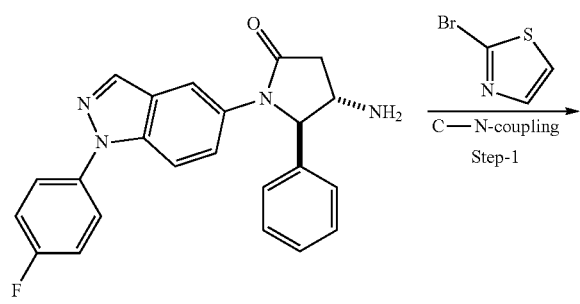

Step 1: To a solution of intermediate C2-ent1 (50 mg, 0.13 mmol), [(2-Di-tert-butylphosphino-3,6-dimethoxy-2',4',6'-triisopropyl-1,1'-biphenyl)-2-(2'-amino-1,1'-biphenyl)]palladium(II)methanesulfonate (11.1 mg, 10 mol-%) and 2-bromothiazole (27.6 mg, 0.168 mmol, 1.3 eq.) in dry dioxane (1.3 mL) was added sodium tert-butoxide (24.9 mg, 0.259 mmol, 2.0 eq.) under inert atmosphere. The mixture was stirred at rt overnight before 2-bromothiazole (21.2 mg, 0.13 mmol, 1.0 eq.) and sodium tert-butoxide (12.4 mg, 0.129 mmol, 1.0 eq.) were added. The resulting mixture was heated at 40° C. overnight. After quenching with water (1 mL), DCM (5 ml) was added and the layers were separated by the means of a hydrophobic frit. After the solvent was evaporated, the crude product was purified via flash chromatography (silica, cyclohexane/ethyl acetate gradient as eluent) and subsequent prep-HPLC (water/acetonitrile gradient) to obtain example 12 (4S,5R)-1-(1-(4-fluorophenyl)-1H-indazol-5-yl)-5-phenyl-4-(thiazol-2-ylamino)pyrrolidin-2-one (16.4 mg, 0.0349 mmol, 27%).

1H NMR (DMSO-d6) δ: 8.34-8.28 (m, 1H), 7.89 (dd, 1H), 7.77-7.62 (m, 5H), 7.48-7.44 (m, 2H), 7.43-7.30 (m, 4H), 7.26 (td, 1H), 7.14 (d, 1H), 6.73 (d, 1H), 5.44 (d, 1H), 4.19 (ddd, 1H), 3.16 (dd, 1H), 2.55 (d, 1H).

EXAMPLE 13: (4S,5R)-1-(1-(4-FLUOROPHENYL)-1H-INDAZOL-5-YL)-5-PHENYL-4-(PYRIDIN-2-YLAMINO)PYRROLIDIN-2-ONE

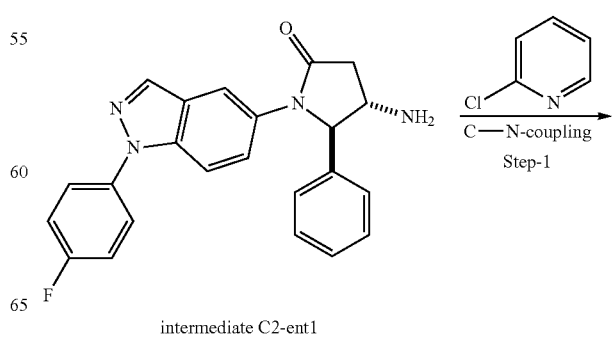

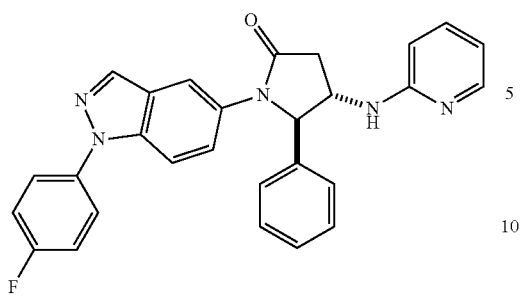

example 13

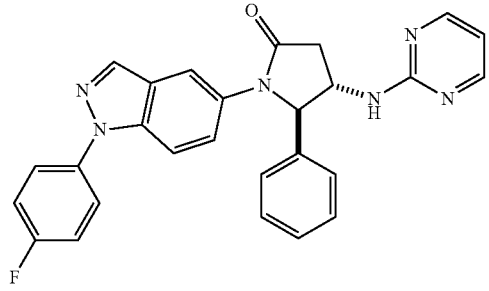

example 14

Step 1: To a solution of intermediate C₂-ent2 (50 mg, 0.13 mmol), [(2-Di-tert-butylphosphino-3,6-dimethoxy-2',4',6'-triisopropyl-1,1'-biphenyl)-2-(2'-amino-1,1'-biphenyl)]palladium(II)methanesulfonate (11.1 mg, 10 mol-%) and 2-chloropyridine (19.1 mg, 0.168 mmol, 1.3 eq.) in dry dioxane (1.3 mL) was added lithium hexamethyldisilazide (LHMDS) solution (1M in THF, 0.259 mL, 2.0 eq) under inert atmosphere, and the mixture was stirred at rt overnight. After quenching with water (1 mL), DCM (5 mL) was added and the layers were separated by means of a hydrophobic frit. After the solvent was evaporated, the crude product was purified via flash chromatography (silica, cyclohexane/ethyl acetate gradient) and subsequent preparative HPLC (water/acetonitrile gradient) to obtain example 13 (4S,5R)-1-(1-(4-fluorophenyl)-1H-indazol-5-yl)-5-phenyl-4-(pyridin-2-ylamino)pyrrolidin-2-one (17.4 mg, 0.0384 mmol, 30%).

¹H NMR (DMSO-d₆) δ: 8.24 (dd, 1H), 8.00 (d, 1H), 7.85-7.81 (m, 1H), 7.65 (dd, 1H), 7.63-7.54 (m, 2H), 7.57-7.47 (m, 3H), 7.43 (ddd, 1H), 7.39 (dd, 2H), 7.34-7.27 (m, 1H), 7.22-7.13 (m, 2H), 6.68 (ddd, 1H), 6.47 (d, 1H), 5.37 (d, 1H), 4.98 (d, 1H), 4.45 (tt, 1H), 3.25 (dd, 1H), 2.54 (dd, 1H), 1.58 (s, 1H).

EXAMPLE 14: (4S,5R)-1-(1-(4-FLUOROPHENYL)-1H-INDAZOL-5-YL)-5-PHENYL-4-(PYRIMIDIN-2-YLAMINO)PYRROLIDIN-2-ONE

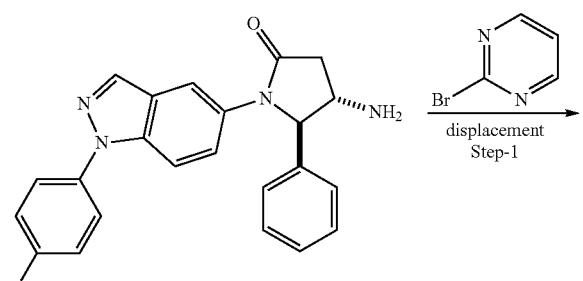

intermediate C2-ent1

Step 1: To a solution of intermediate C₂-ent1 (50 mg, 0.13 mmol) and 2-bromopyrimidine (27.4 mg, 0.155 mmol, 1.2 eq.) in dry 1-butanol (0.6 mL) was added diisopropylethylamine (67 μL, 0.388 mmol, 3.0 eq.), and the mixture was put in a microwave and heated at 110° C. overnight. The reaction was quenched with sat. NaHCO₃-solution and diluted with DCM (5 mL). The layers were separated by means of a hydrophobic frit and the crude product was purified via flash chromatography (silica, cyclohexane/ethyl acetate gradient) to yield example 14 (4S,5R)-1-(1-(4-fluorophenyl)-1H-indazol-5-yl)-5-phenyl-4-(pyrimidin-2-ylamino)pyrrolidin-2-one (4.7 mg, 0.010 mmol, 8%).

¹H NMR (DMSO-d₆) δ: 8.35 (d, 1H), 8.28 (s, 1H), 7.93 (d, 1H), 7.87 (d, 1H), 7.77-7.64 (m, 4H), 7.44 (d, 2H), 7.42-7.35 (m, 2H), 7.33 (t, 2H), 7.27-7.20 (m, 1H), 6.67 (t, 1H), 5.38 (d, 1H), 4.35 (ddd, 1H), 3.10 (dd, 1H), 2.62 (dd, 1H), 2.54 (s, 1H).

EXAMPLE 15: (4S,5R)-1-(1-(4-FLUOROPHENYL)-1H-INDAZOL-5-YL)-3,3-DIMETHYL-5-PHENYL-4-(PYRIMIDIN-2-YLAMINO)PYRROLIDIN-2-ONE

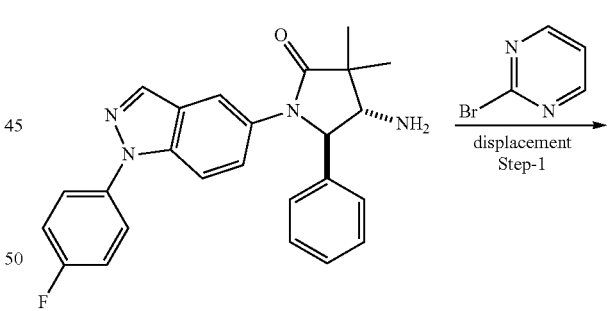

intermediate C1-ent1

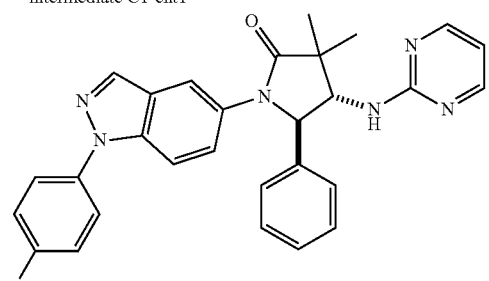

example 15

Example 15 was prepared in analogy to the synthesis described for example 14 using intermediate $C_1$-ent1 instead of intermediate $C_2$-ent1. Yield: 7%

$^1$H NMR (600 MHz, CDCl$_3$) δ 8.20 (d, 2H), 8.11 (d, 1H), 7.75 (d, 1H), 7.68-7.61 (m, 2H), 7.56 (d, 1H), 7.49 (dd, 1H), 7.39-7.29 (m, 2H), 7.28-7.21 (m, 4H), 7.21-7.15 (m, 1H), 6.54 (t, 1H), 5.51 (d, 1H), 5.35 (s, 1H), 4.97 (d, 1H), 4.92 (dd, 8.0 Hz, 1H), 1.78 (s, 1H), 1.50 (s, 3H), 1.37 (s, 3H), 0.14 (s, 1H).

GRE Agonist

The reporter cell line CHO-Gal4/GR consisted of a chinese hamster ovary (CHO) cell line (Leibniz Institute DSMZ—German Collection of Microorganisms and Cell Cultures GmbH: ACC-110) containing a firefly luciferase gene under the control of the GR ligand binding domain fused to the DNA binding domain (DBD) of GAL4 (GAL4 DBD-GR) stably integrated into CHO cells. This cell line was established by stable transfection of CHO cells with a GAL4-UAS-Luciferase reporter construct. In a subsequent step the ligand binding domain of the GR cloned into pIRES2-EGFP-GAL4 containing the DNA binding domain of GAL4 from pFA-AT2 was transfected. This fusion construct activated firefly luciferase expression under the control of a multimerized GAL4 upstream activation sequence (UAS). The signal of the emitted luminescence was recorded by the FLIPR$^{TETRA}$ (multimode microplate reader). This allowed for specific detection of ligand -induced activation of the GR and therefore for the identification of compounds with agonistic properties. The GAL4/UAS reporter was premixed with a vector that constitutively expressed Renilla luciferase, which served as an internal positive control for transfection efficiency.

The complete culture medium for the assay was:
- DMEM F-12 (1:1) MIXTURE (LONZA cat. No: BE04-687F/UI) 500 mL
- 5 mL of 100 mM Sodium Pyruvate (LONZA cat. No: BE12-115E)
- 25 mL of 7.5% Sodium Bicarbonate (LONZA cat. No: BE17-613E)
- 6.5 mL of 1 M Hepes (LONZA cat. No: BE17-737E)
- 5 mL of 100× Penicillin/Streptomycin (LONZA cat. No: DE17-602E)
- 50 mL of Fetal Bovine Serum (Euroclone cat. No: ECS 0180L)
- 0.25 mL of 10 mg/mL Puromycin (InvivoGen cat.: ant-pr-1)
- 0.5 mL of 100 mg/mL Zeocin (InvivoGen cat.: ant-zn-1)

Cryo-preserved CHO-Gal4/GR cells were suspended in complete medium and 5000 cells/25 µl/well were seeded into the wells of 384-well polystyrene assay plates (Thermo Scientific, cat. #4332) and cultured at 37° C., 5% CO$_2$ and 95% humidity. After 24 hours growth medium was carefully removed and replaced by 30 µl Opti-MEM (cell culture medium) (GIBCO, cat. #31985062) as assay buffer. To test the compounds an 8-point half-log compound dilution curve was generated in 100% DMSO starting from a 2 mM stock and compounds were then diluted 1:50 in Opti-MEM. 10 µl of compounds were then added to the wells containing 30 µl Opti-MEM (cell culture medium) resulting in a final assay concentration range from 10 µM to 0.003 µM in 0.5% DMSO. Compounds were tested at 8 concentrations in quadruplicate data points. Cells were incubated for 6 hour with compounds and beclometasone (Sigma, cat. #Y0000351) as control compound at 37° C., 5% CO$_2$ and 95% humidity in a total volume of 40 µl. Finally, cells were lysed with 20 µl of Triton/Luciferin solution and the signal of the emitted luminescence was recorded at the FLIPR$^{TETRA}$ (multimode microplate reader) for 2 minutes.

The relative efficacy of a compound (% effect) was calculated based on the full effect of the agonist beclometasone:

$$\% \text{ effect} = ((\text{compound} - \text{min})/(\text{max} - \text{min})) \times 100$$

[min=Opti-MEM (cell culture medium) only, max=beclometasone]

To calculate EC$_{50}$, max, min and slope factor for each compound a concentration response curve was fitted by plotting % effect versus compound concentration using a 4 parameter logistic equation:

$$y = A + (B-A)/(1+((10C)/x)D)$$

[A=min y, B=max y, C=log EC$_{50}$, D=slope]

GRE Antagonist

The reporter cell line CHO-Gal4/GR consisted of a chinese hamster ovary (CHO) cell line (Leibniz Institute DSMZ—German Collection of Microorganisms and Cell Cultures GmbH: ACC-110) containing a firefly luciferase gene under the control of the GR ligand binding domain fused to the DNA binding domain (DBD) of GAL4 (GAL4 DBD-GR) stably integrated into CHO cells. This cell line was established by stable transfection of CHO cells with a GAL4-UAS-Luciferase reporter construct. In a subsequent step the ligand binding domain of the GR cloned into pIRES2-EGFP-GAL4 containing the DNA binding domain of GAL4 from pFA-AT2 was transfected. This fusion construct activated firefly luciferase expression under the control of a multimerized GAL4 upstream activation sequence (UAS). The signal of the emitted luminescence was recorded by the FLIPR$^{TETRA}$. This allowed for specific detection of antagonistic properties of compounds by measuring the ligand -induced inhibition of beclometasone-activated GR. The GAL4/UAS reporter was premixed with a vector that constitutively expressed Renilla luciferase, which served as an internal positive control for transfection efficiency.

The complete culture medium for the assay was:
- DMEM F-12 (1:1) MIXTURE (LONZA cat. No: BE04-687F/U1) 500 mL
- 5 mL of 100 mM Sodium Pyruvate (LONZA cat. No: BE12-115E)
- 25 mL of 7.5% Sodium Bicarbonate (LONZA cat. No: BE17-613E)
- 6.5 mL of 1 M Hepes (LONZA cat. No: BE17-737E)
- 5 mL of 100× Penicillin/Streptomycin (LONZA cat. No: DE17-602E)
- 50 mL of Fetal Bovine Serum (Euroclone cat. No: ECS 0180L)
- 0.25 mL of 10 mg/mL Puromycin (InvivoGen cat.: ant-pr-1)
- 0.5 mL of 100 mg/mL Zeocin (InvivoGen cat.: ant-zn-1)

Cryo-preserved CHO-Gal4/GR cells were suspended in complete medium and 5000 cells/25 µl/well were seeded into the wells of 384-well polystyrene assay plates (Thermo Scientific, cat. #4332) and cultured at 37° C., 5% CO$_2$ and 95% humidity. After 24 hours growth medium was carefully removed and replaced by 20 µl Opti-MEM (cell culture medium) (GIBCO, cat. #31985062) as assay buffer. For testing compounds an 8-point half-log compound dilution curve was generated in 100% DMSO starting from a 2 mM stock and compounds were then diluted 1:50 in Opti-MEM (cell culture medium). To test the compounds in the antagonist mode 10 µl of compounds were then added to the wells containing 20 µl Opti-MEM (cell culture medium) and incubated for 10 min. After this pre-incubation 10 µl of the reference agonist beclometasone (Sigma, cat. #Y0000351) at an EC50 of 2.5 nM were added resulting in a final assay concentration range from 10 μM to 0.003 μM in 0.5% DMSO in a total volume of 40 μl. Compounds were tested at 8 concentrations in quadruplicate data points. Cells were incubated for 6 hour with compounds and mifepristone as control compound (Sigma, cat. #M8046) at 37° C., 5% $CO_2$ and 95% humidity. Finally, cells were lysed with 20 μl of Triton/Luciferin solution and the signal of the emitted luminescence was recorded at the FLIPR$^{TETRA}$ (multimode microplate reader) for 2 minutes.

The relative efficacy of a compound (% effect) was calculated based on the full effect of the antagonist mifepristone:

% effect=((compound−min)/(max−min))×−100

[min=Opti-MEM (cell culture medium) only, max=mifepristone]

To calculate $IC_{50}$, max, min and slope factor for each compound a concentration response curve was fitted by plotting % effect versus compound concentration using a 4 parameter logistic equation:

$y=A+(B-A)/(1+((10C)/x)D)$

[A=min y, B=max y, C=log $IC_{50}$, D=slope]

Table summarizing biological data:

| cmpd # | IC50 or EC50 A < 100 nM, B = 100 nM-1 μM, C = 1 μM-15 μM |
|---|---|
| 1 | B |
| 2 | C |
| 3 | C |
| 4 | C |
| 5 | B |
| 6 | B |
| 7 | C |
| 8 | C |
| 9 | C |
| 10 | B |
| 11 | C |
| 12 | A |
| 13 | B |
| 14 | A |
| 15 | A |

"n.a.": not active in the GR cell-based assays, neither in the agonistic nor in the antagonistic mode.
"n.d.": not determined.

Prophetic Examples

The prophetic examples summarized in the following table could be synthesized in analogy to Examples 1, 2, 12 and 14 described above. The person skilled in the art would know how to select suitable intermediates in order to obtain any to the prophetic examples 16 to 27.

| Proph. Ex. # | Structure |
|---|---|
| 16 | 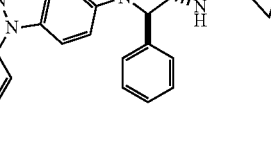 |
| 17 | 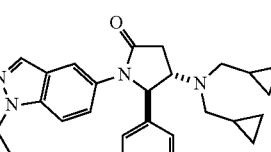 |
| 18 | 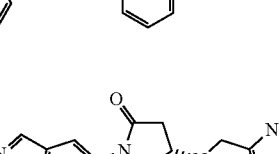 |
| 19 | 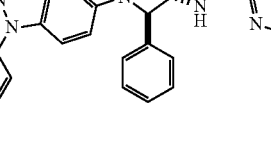 |
| 20 | 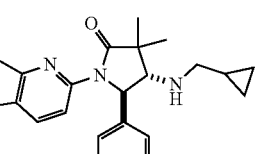 |
| 21 | 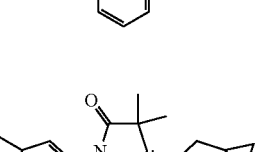 |
| 22 | 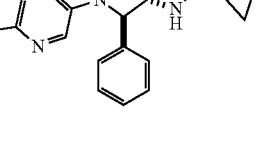 |
| 23 | |

| Proph. Ex. # | Structure |
|---|---|
| 24 | |
| 25 | |
| 26 | |
| 27 | |

| Proph. Ex. # | Structure |
|---|---|
| 28 | |
| 29 | |
| 30 | |
| 31 | |
| 32 | |
| 33 | |
| 34 | 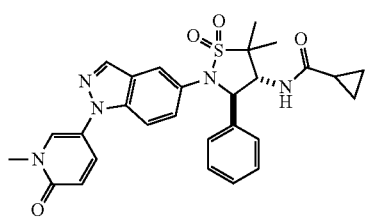 [SMILES: Cn1cc(-n2ncc3cc(N4[C@H](c5ccccc5)[C@@H](NC(=O)C5CC5)C(C)(C)S4(=O)=O)ccc32)ccc1=O] |

In the above table, the prophetic example compounds wherein the substituents which are connected to the central pyrrolidone have a different relative orientation, e.g. phenyl moiety and methyl moiety up ("bold bond", ✦) and amide moiety down ("hashed bond", ⸜) or vice versa, are the "trans" diastereomer which is a racemic mixture of the two corresponding trans enantiomers.

The prophetic examples summarized in the following table could be synthesized according to reaction scheme 1.1 and reaction scheme 1, using Route 1 in reaction scheme 1.1. In reaction scheme 1.1, compounds of the general formula (H) need to be exchanged for compounds containing either a sulfonyl chloride or a sulfonate instead of an ester. The person skilled in the art would know how to select suitable intermediates in order to obtain any to the prophetic examples 28 to 39.

-continued

| Proph. Ex. # | Structure |
|---|---|
| 35 | 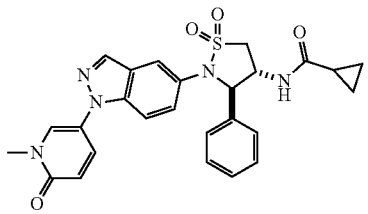 [SMILES: Cn1cc(-n2ncc3cc(N4[C@H](c5ccccc5)[C@@H](NC(=O)C5CC5)CS4(=O)=O)ccc32)ccc1=O] |
| 36 | 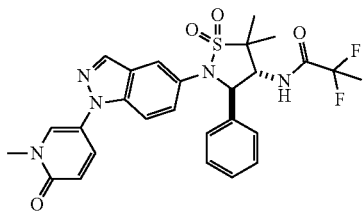 [SMILES: Cn1cc(-n2ncc3cc(N4[C@H](c5ccccc5)[C@@H](NC(=O)C(C)(F)F)C(C)(C)S4(=O)=O)ccc32)ccc1=O] |
| 37 | 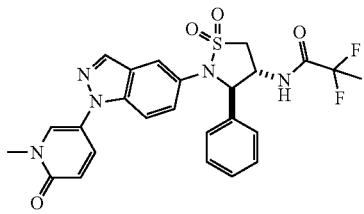 [SMILES: Cn1cc(-n2ncc3cc(N4[C@H](c5ccccc5)[C@@H](NC(=O)C(C)(F)F)CS4(=O)=O)ccc32)ccc1=O] |
| 38 | 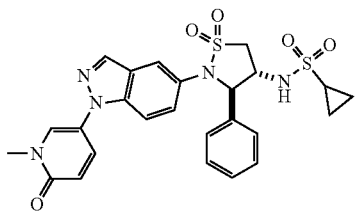 [SMILES: Cn1cc(-n2ncc3cc(N4[C@H](c5ccccc5)[C@@H](NS(=O)(=O)C5CC5)CS4(=O)=O)ccc32)ccc1=O] |
| 39 | 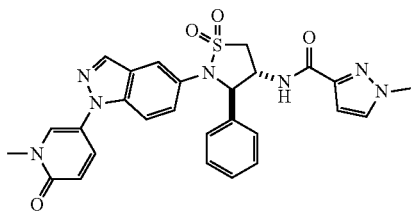 |

In the above table, the prophetic example compounds wherein the substituents which are connected to the central pyrrolidone have a different relative orientation, e.g. phenyl moiety and methyl moiety up ("bold bond", ◢) and amide moiety down ("hashed bond", ⸺) or vice versa, are the "trans" diastereomer which is a racemic mixture of the two corresponding trans enantiomers.

The invention claimed is:
1. A compound according to general formula (I),

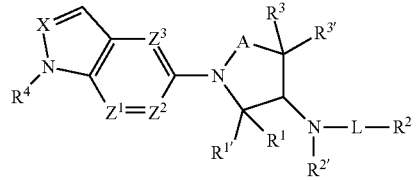

wherein
A represents C=O or S(=O)$_2$;
R$^1$ represents phenyl; —C$_{1-6}$-alkylene-phenyl; 5 or 6-membered heteroaryl; or —C$_{1-6}$-alkylene- (5 or 6-membered heteroaryl);
R$^{1'}$ represents H; or —C$_{1-10}$-alkyl;
L represents bond; —C$_{1-6}$-alkylene; C=O; or S(O)$_2$; wherein if A represents C=O, L neither represents C=O nor S(O)$_2$;
R$^2$ represents —C$_{1-10}$-alkyl; —C$_{3-10}$-cycloalkyl; 3 to 7 membered heterocycloalkyl; phenyl; or 5 or 6-membered heteroaryl;
R$^{2'}$ represents H; or —C$_{1-10}$-alkyl; —C$_{3-10}$-cycloalkyl; or —C$_{1-6}$-alkylene-C$_{3-10}$-cycloalkyl;
R$^3$ and R$^{3'}$ independently from one another represent H; or —C$_{1-10}$-alkyl;
or R$^3$ and R$^{3'}$ together with the carbon atom to which they are bound form a C$_{3-10}$-cycloalkyl; or 3 to 7 membered heterocycloalkyl;
R$^4$ represents phenyl; or 5 or 6-membered heteroaryl;
X represents N or CH;
Z$^1$, Z$^2$ and Z$^3$ each independently from one another represent N or CH;
wherein-C$_{1-10}$-alkyl and —C$_{1-6}$-alkylene- in each case independently from one another is linear or branched, saturated or unsaturated;
wherein-C$_{1-10}$-alkyl, —C$_{1-6}$-alkylene-, —C$_{3-10}$-cycloalkyl and 3 to 7 membered heterocycloalkyl in each case independently from one another are unsubstituted or mono- or polysubstituted with one or more substituents selected from —F; —Cl; —Br; —I; —CN; —C$_{1-6}$-alkyl; —CF$_3$; —CF$_2$H; —CFH$_2$; —CF$_2$Cl; —CFCl$_2$; —C(=O)—C$_{1-6}$-alkyl; —C(=O)—OH; —C(=O)—OC$_{1-6}$-alkyl; —C(=O)—NH$_2$; —C(=O)—NH(C$_{1-6}$-alkyl); —C(=O)—N(C$_{1-6}$-alkyl)$_2$; —OH; —OCF$_3$; —OCF$_2$H; —OCFH$_2$; —OCF$_2$Cl; —OCFCl$_2$; —O—C$_{1-6}$-alkyl; —O—C(=O)—C$_{1-6}$-alkyl; —O—C(=O)—O—C$_{1-6}$-alkyl; —O—(CO)—NH(C$_{1-6}$-alkyl); —O—C(=O)—N(C$_{1-6}$-alkyl)$_2$; —O—S(=O)$_2$—NH$_2$; —O—S(=O)$_2$—NH(C$_{1-6}$-alkyl); —O—S(=O)$_2$—N(C$_{1-6}$-alkyl)$_2$; —NH$_2$; —NH(C$_{1-6}$-alkyl); —N(C$_{1-6}$-alkyl)$_2$; —NH—C(=O)—C$_{1-6}$-alkyl; —NH—C(=O)—O—C$_{1-6}$-alkyl; —NH—C(=O)—NH$_2$; —NH—C(=O)—NH(C$_{1-6}$-alkyl); —NH—C(=O)—N(C$_{1-6}$-alkyl)$_2$; —N(C$_{1-6}$-alkyl)-C(=O)—C$_{1-6}$-alkyl; —N(C$_{1-6}$-alkyl)-C(=O)—O—C$_{1-6}$-alkyl; —N(C$_{1-6}$-alkyl)-C(=O)—NH$_2$; —N(C$_{1-6}$-alkyl)-C(=O)—NH(C$_{1-6}$-alkyl); —N(C$_{1-6}$-alkyl)-C(=O)—N(C$_{1-6}$-alkyl)$_2$; —NH—S(=O)$_2$OH; NH—S(=O)$_2$—C$_{1-6}$-alkyl; —NH—S(=O)$_2$—O—C$_{1-6}$-alkyl; —NH—S(=O)$_2$—NH$_2$; —NH—S(=O)$_2$—NH(C$_{1-6}$-alkyl); —NH—S(=O)$_2$N(C$_{1-6}$-alkyl)$_2$; —N(C$_{1-6}$-alkyl)-S(=O)$_2$—OH; —N(C$_{1-6}$-alkyl)-S(=O)$_2$—C$_{1-6}$-alkyl; —N(C$_{1-6}$-alkyl)-S(=O)$_2$—O—C$_{1-6}$-alkyl; —N(C$_{1-6}$-alkyl)-S (=O)$_2$—NH$_2$; —N(C$_{1-6}$-alkyl)-S(=O)$_2$—NH(C$_{1-6}$-alkyl); —N(C$_{1-6}$-alkyl)-S(=O)$_2$—N(C$_{1-6}$-alkyl)$_2$; —SCF$_3$; —SCF$_2$H; —SCFH$_2$; —S—C$_{1-6}$-alkyl; —S(=O)—C$_{1-6}$-alkyl; —S(=O)$_2$—C$_{1-6}$-alkyl; —S(=O)$_2$—OH; —S(=O)$_2$—O—C$_{1-6}$-alkyl; —S(=O)$_2$—NH$_2$; —S(=O)$_2$—NH(C$_{1-6}$-alkyl); —S(=O)$_2$—N(C$_{1-6}$-alkyl)$_2$; —C$_{3-6}$-cycloalkyl; 3 to 6-membered heterocycloalkyl; phenyl; 5 or 6-membered heteroaryl; —O—C$_{3-6}$-cycloalkyl; —O-(3 to 6-membered heterocycloalkyl); —O-phenyl; —O-(5 or 6-membered heteroaryl); —C(=O)—C$_{3-6}$-cycloalkyl; —C(=O)-(3 to 6-membered heterocycloalkyl); —C(=O)-phenyl; —C(=O)-(5 or 6-membered heteroaryl); —S(=O)$_2$—(C$_{3-6}$-cycloalkyl); —S(=O)$_2$-(3 to 6-membered heterocycloalkyl); —S(=O)$_2$-phenyl and —S(=O)$_2$-(5 or 6-membered heteroaryl);

wherein phenyl and 5 or 6-membered heteroaryl in each case independently from one another are unsubstituted or mono- or polysubstituted with one or more substituents selected from —F; —Cl; —Br; —I; —CN; —C$_{1-6}$-alkyl; —CF$_3$; —CF$_2$H; —CFH$_2$; —CF$_2$Cl; —CFCl$_2$; —C$_{1-4}$-alkylene-CF$_3$; —C$_{1-4}$-alkylene-CF$_2$H; —C$_{1-4}$-alkylene-CFH$_2$; —C(=O)—C$_{1-6}$-alkyl; —C(=O)—OH; —C(=O)—OC$_{1-6}$-alkyl; —C(=O)—NH(OH); —C(=O)—NH$_2$; —C(=O)—NH(C$_1$-6-alkyl); —C(=O)—N(C$_{1-6}$-alkyl)$_2$; —OH; —O; —OCF$_3$; —OCF$_2$H; —OCFH$_2$; —OCF$_2$Cl; —OCFCl$_2$; —O—C$_{1-6}$-alkyl; —O—C$_{3-6}$-cycloalkyl; —O-(3 to 6-membered heterocycloalkyl); —O-phenyl; —O-(5 or 6-membered heteroaryl); —NH$_2$; —NH(C$_{1-6}$-alkyl); —N(C$_{1-6}$-alkyl)$_2$; —NH—C(=O)—C$_{1-6}$-alkyl; —N(C$_{1-6}$-alkyl)-C(=O)—C$_{1-6}$-alkyl; —NH—C(=O)—NH$_2$; —NH—C(=O)—NH(C$_{1-6}$-alkyl); —NH—C(=O)—N(C$_{1-6}$-alkyl)$_2$; —N(C$_{1-6}$-alkyl)-C(=O)—NH(C$_{1-6}$-alkyl); —N(C$_{1-6}$-alkyl)-C(=O)—N(C$_{1-6}$-alkyl)$_2$; —NH—S(=O)$_2$—C$_{1-6}$-alkyl; —SCF$_3$; —S—C$_{1-6}$-alkyl; —S(=O)—C$_{1-6}$-alkyl; —S(=O)$_2$—C$_{1-6}$-alkyl; —S(=O)$_2$—NH$_2$; —S(=O)$_2$—NH(C$_{1-6}$-alkyl); —S(=O)$_2$—N(C$_{1-6}$-alkyl)$_2$; —C$_{3-6}$-cycloalkyl; —C$_{1-4}$-alkylene-C$_{3-6}$-cycloalkyl; 3 to 6-membered heterocycloalkyl; —C$_{1-4}$-alkylene-(3 to 6-membered heterocycloalkyl); phenyl and 5 or 6-membered heteroaryl;

said compound being in the form of the free compound or a physiologically acceptable salt thereof.

2. The compound according to claim 1, wherein X represents N; and/or Z$^1$, Z$^2$ and Z$^3$ each represent CH.

3. The compound according to claim 1, wherein R$^{1'}$ represents H.

4. The compound according to claim 1, wherein R$^1$ represents phenyl.

5. The compound according to claim 1, wherein R$^{2'}$ represents H; —C$_{3-10}$-cycloalkyl; or —C$_{1-6}$-alkylene-C$_{3-10}$-cycloalkyl.

6. The compound according to claim 5, wherein R$^{2'}$ represents H; cyclopropyl; or —CH$_2$-cyclopropyl.

7. The compound according to claim 1, wherein R$^2$ represents (i) —C$_{1-10}$-alkyl selected from the group consisting of methyl, ethyl, n-propyl, and 2-propyl; wherein said methyl, ethyl, n-propyl, and 2-propyl can be unsubstituted, monosubstituted or disubstituted with a substituent selected from the group consisting of —F, —Cl, —OH, —CN and —CF$_3$;

(ii) —C$_{3-10}$-cycloalkyl selected from the group consisting of cyclopropyl; cyclobutyl; cyclopentyl and cyclohexyl;

(iii) 3 to 7 membered heterocycloalkyl selected from the group consisting of oxetanyl; tetrahydropyranyl; thetrahydrofuranyl; oxiranyl; tetrahydropyridinyl; morpholinyl; pyrrolidinyl; and piperidinyl;

(iv) phenyl; or (v) 5 or 6-membered heteroaryl selected from the group consisting of pyridinyl; pyrimidinyl; pyrazolyl; thiazolyl; pyridonyl; N-methylpyridonyl; pyridazinyl; pyrazinyl; imidazolyl; oxazolyl; isoxazolyl; isothiazolyl; furanyl; thienyl; and triazolyl; wherein said pyridinyl; pyrimidinyl; pyrazolyl; thiazolyl; pyridonyl; N-methylpyridonyl; pyridazinyl; pyrazinyl; imidazolyl; oxazolyl; isoxazolyl; isothiazolyl; furanyl; thienyl; and triazolyl can be unsubstituted, monosubstituted or disubstituted with a substituent selected from the group consisting of —F, —Cl, —CH$_3$, —OH, —CN and —CF$_3$.

8. The compound according to claim 7, wherein R$^2$ represents phenyl; cyclopropyl; oxetanyl; tetrahydropyranyl; pyridinyl; pyrimidinyl; pyrazolyl; N-methylpyrazolyl; thiazolyl; or difluoroethane.

9. The compound according to claim 1, wherein R$^3$ and R$^{3'}$ independently from one another represent H; or —CH$_3$; or R$^3$ and R$^{3'}$ together with the carbon atom to which they are bound form cyclopropyl, cyclobutyl; oxiranyl; or oxetanyl.

10. The compound according to claim 9, wherein R$^3$ and R$^{3'}$ independently from one another represent H; or —CH$_3$.

11. The compound according to claim 1, wherein R$^4$ represents phenyl; fluoro-phenyl; pyridonyl; or N-methylpyridonyl.

12. The compound according to claim 1, which is selected from the group consisting of:

1 (4S,5R)-4-((cyclopropylmethyl)amino)-1-(1-(4-fluorophenyl)-1H-indazol-5-yl)-3,3-dimethyl-5-phenylpyrrolidin-2-one;

2 (4S,5R)-4-((cyclopropylmethyl)amino)-1-(1-(4-fluorophenyl)-1H-indazol-5-yl)-5-phenylpyrrolidin-2-one;

3 (4S,5R)-4-(bis(cyclopropylmethyl)amino)-1-(1-(4-fluorophenyl)-1H-indazol-5-yl)-5-phenylpyrrolidin-2-one;

4 rac-(3R,4R,5S)-4-(cyclopropylmethylamino)-1-[1-(4-fluorophenyl)indazol-5-yl]-3-methyl-5-phenylpyrrolidin-2-one;

5 (4S,5R)-1-(1-(4-fluorophenyl)-1H-indazol-5-yl)-3,3-dimethyl-5-phenyl-4-((pyrimidin-2-ylmethyl)amino)pyrrolidin-2-one;

6 (4S,5R)-1-(1-(4-fluorophenyl)-1H-indazol-5-yl)-5-phenyl-4-((pyrimidin-2-ylmethyl)amino)pyrrolidin-2-one;

7 rac-(3R,4R,5S)-1-[1-(4-fluorophenyl)indazol-5-yl]-3-methyl-5-phenyl-4-(pyrimidin-2-ylmethylamino)pyrrolidin-2-one;

8 (4S,5R)-1-(1-(4-fluorophenyl)-1H-indazol-5-yl)-3,3-dimethyl-4-(((1-methyl-1H-pyrazol-3-yl)methyl)amino)-5-phenylpyrrolidin-2-one;

9 (4S,5R)-1-(1-(4-fluorophenyl)-1H-indazol-5-yl)-3,3-dimethyl-4-((oxetan-3-ylmethyl)amino)-5-phenylpyrrolidin-2-one;

10 (4S,5R)-1-(1-(4-fluorophenyl)-1H-indazol-5-yl)-3,3-dimethyl-5-phenyl-4-(((tetrahydro-2H-pyran-4-yl)methyl)amino)pyrrolidin-2-one;

11 rac-(3R,4R,5S)-4-(benzylamino)-1-[1-(4-fluorophenyl)indazol-5-yl]-3-methyl-5-phenylpyrrolidin-2-one;

12 (4S,5R)-1-(1-(4-fluorophenyl)-1H-indazol-5-yl)-5-phenyl-4-(thiazol-2-ylamino)pyrrolidin-2-one;

13 (4S,5R)-1-(1-(4-fluorophenyl)-1H-indazol-5-yl)-5-phenyl-4-(pyridin-2-ylamino)pyrrolidin-2-one;

14 (4S,5R)-1-(1-(4-fluorophenyl)-1H-indazol-5-yl)-5-phenyl-4-(pyrimidin-2-ylamino)pyrrolidin-2-one;
15 (4S,5R)-1-(1-(4-fluorophenyl)-1H-indazol-5-yl)-3,3-dimethyl-5-phenyl-4-(pyrimidin-2-ylamino)pyrrolidin-2-one;
16 5-(5-((4S,5R)-4-((cyclopropylmethyl)amino)-3,3-dimethyl-2-oxo-5-phenylpyrrolidin-1-yl)-1H-indazol-1-yl)-1-methylpyridin-2(1H)-one;
17 5-(5-((2R,3S)-3-((cyclopropylmethyl)amino)-5-oxo-2-phenylpyrrolidin-1-yl)-1H-indazol-1-yl)-1-methylpyridin-2(1H)-one;
18 5-(5-((2R,3S)-3-(bis(cyclopropylmethyl)amino)-5-oxo-2-phenylpyrrolidin-1-yl)-1H-indazol-1-yl)-1-methylpyridin-2(1H)-one;
19 1-methyl-5-(5-((2R,3S)-5-oxo-2-phenyl-3-((pyrimidin-2-ylmethyl)amino)pyrrolidin-1-yl)-1H-indazol-1-yl)pyridin-2(1H)-one;
20 (4S,5R)-4-((cyclopropylmethyl)amino)-1-(1-(4-fluorophenyl)-1H-pyrazolo[4,3-b]pyridin-5-yl)-3,3-dimethyl-5-phenylpyrrolidin-2-one;
21 (4S,5R)-4-((cyclopropylmethyl)amino)-1-(1-(4-fluorophenyl)-1H-pyrazolo[3,4-b]pyridin-5-yl)-3,3-dimethyl-5-phenylpyrrolidin-2-one;
22 5-(5-((4S,5R)-3,3-dimethyl-2-oxo-5-phenyl-4-(pyrimidin-2-ylamino)pyrrolidin-1-yl)-1H-indazol-1-yl)-1-methylpyridin-2(1H)-one;
23 1-methyl-5-(5-((2R,3S)-5-oxo-2-phenyl-3-(pyrimidin-2-ylamino)pyrrolidin-1-yl)-1H-indazol-1-yl)pyridin-2(1H)-one;
24 5-(5-((4S,5R)-3,3-dimethyl-2-oxo-5-phenyl-4-(thiazol-2-ylamino)pyrrolidin-1-yl)-1H-indazol-1-yl)-1-methylpyridin-2(1H)-one;
25 1-methyl-5-(5-((2R,3S)-5-oxo-2-phenyl-3-(thiazol-2-ylamino)pyrrolidin-1-yl)-1H-indazol-1-yl)pyridin-2(1H)-one;
26 (4S,5R)-4-((cyclopropylmethyl)amino)-1-(1-(4-fluorophenyl)-1H-pyrazolo[3,4-c]pyridin-5-yl)-3,3-dimethyl-5-phenylpyrrolidin-2-one;
27 (4S,5R)-4-((cyclopropylmethyl)amino)-1-(1-(4-fluorophenyl)-1H-indol-5-yl)-3,3-dimethyl-5-27 phenylpyrrolidin-2-one;
28 N-((3R,4R)-2-(1-(4-fluorophenyl)-1H-indazol-5-yl)-5,5-dimethyl-1,1-dioxido-3-phenylisothiazolidin-4-yl)cyclopropanecarboxamide;
29 N-((3R,4R)-2-(1-(4-fluorophenyl)-1H-indazol-5-yl)-1,1-dioxido-3-phenylisothiazolidin-4-29 yl)cyclopropanecarboxamide;
30 2,2-difluoro-N-((3R,4R)-2-(1-(4-fluorophenyl)-1H-indazol-5-yl)-5,5-dimethyl-1,1-dioxido-3-phenylisothiazolidin-4-yl) propanamide;
31 2,2-difluoro-N-((3R,4R)-2-(1-(4-fluorophenyl)-1H-indazol-5-yl)-1,1-dioxido-3-phenylisothiazolidin-4-yl) propanamide;
32 N-((3R,4R)-2-(1-(4-fluorophenyl)-1H-indazol-5-yl)-1,1-dioxido-3-phenylisothiazolidin-4-yl) cyclopropanesulfonamide;
33 N-((3R,4R)-2-(1-(4-fluorophenyl)-1H-indazol-5-yl)-1,1-dioxido-3-phenylisothiazolidin-4-yl)-1-methyl-1H-pyrazole-3-carboxamide;
34 N-((3R,4R)-5,5-dimethyl-2-(1-(1-methyl-6-oxo-1,6-dihydropyridin-3-yl)-1H-indazol-5-yl)-1,1-dioxido-3-phenylisothiazolidin-4-yl)cyclopropanecarboxamide;
35 N-((3R,4R)-2-(1-(1-methyl-6-oxo-1,6-dihydropyridin-3-yl)-1H-indazol-5-yl)-1,1-dioxido-3-phenylisothiazolidin-4-yl)cyclopropanecarboxamide;
36 N-((3R,4R)-5,5-dimethyl-2-(1-(1-methyl-6-oxo-1,6-dihydropyridin-3-yl)-1H-indazol-5-yl)-1,1-dioxido-3-phenylisothiazolidin-4-yl)-2,2-difluoropropanamide;
37 2,2-difluoro-N-((3R,4R)-2-(1-(1-methyl-6-oxo-1,6-dihydropyridin-3-yl)-1H-indazol-5-yl)-1,1-dioxido-3-phenylisothiazolidin-4-yl) propanamide;
38 N-((3R,4R)-2-(1-(1-methyl-6-oxo-1,6-dihydropyridin-3-yl)-1H-indazol-5-yl)-1,1-dioxido-3-phenylisothiazolidin-4-yl) cyclopropanesulfonamide; and
39 1-methyl-N-((3R,4R)-2-(1-(1-methyl-6-oxo-1,6-dihydropyridin-3-yl)-1H-indazol-5-yl)-1,1-dioxido-3-phenylisothiazolidin-4-yl)-1H-pyrazole-3-carboxamide;
said compound being in the form of the free compound or a physiologically acceptable salt thereof.

13. A pharmaceutical dosage form comprising a compound according to claim 1.

14. A method for treating inflammatory pain in a subject in need thereof, said method comprising administering to said subject an effective amount therefor of a compound according to claim 1.

15. A pharmaceutical dosage form comprising a compound according to claim 12.

16. A method of treating pain and/or inflammation in a subject in need thereof, said method comprising administering to said subject an effective amount therefor of a compound according to claim 1.

17. A method of treating pain and/or inflammation in a subject in need thereof, said method comprising administering to said subject an effective amount therefor of a compound according to claim 12.

18. A method for treating inflammatory pain in a subject in need thereof, said method comprising administering to said subject an effective amount therefor of a compound according to claim 12.

* * * * *